US012438860B2

(12) United States Patent
Purimetla et al.

(10) Patent No.: US 12,438,860 B2
(45) Date of Patent: Oct. 7, 2025

(54) SYSTEMS AND METHODS FOR SECURE AND REMOTE ONBOARDING

(71) Applicant: Citizens Financial Group, Inc., Providence, RI (US)

(72) Inventors: Bhaskar Purimetla, Marlborough, MA (US); Krishna Purimetla, Marlborough, MA (US); Brinda Purimetla, Marlborough, MA (US)

(73) Assignee: Citizens Financial Group, Inc., Providence, RI (US)

( * ) Notice: Subject to any disclaimer, the term of this patent is extended or adjusted under 35 U.S.C. 154(b) by 281 days.

(21) Appl. No.: 18/158,542

(22) Filed: Jan. 24, 2023

(65) Prior Publication Data

US 2023/0247026 A1 Aug. 3, 2023

Related U.S. Application Data

(60) Provisional application No. 63/304,964, filed on Jan. 31, 2022.

(51) Int. Cl.
*H04L 9/40* (2022.01)

(52) U.S. Cl.
CPC .......... *H04L 63/08* (2013.01); *H04L 63/0853* (2013.01); *H04L 63/0884* (2013.01); *H04L 63/102* (2013.01)

(58) Field of Classification Search
CPC . H04L 63/08; H04L 63/0853; H04L 63/0884; H04L 63/102; G06F 9/451
See application file for complete search history.

(56) References Cited

U.S. PATENT DOCUMENTS

| | | | | |
|---|---|---|---|---|
| 8,056,118 B2* | 11/2011 | Piliouras | ............ | G06Q 30/0207 709/217 |
| 9,083,704 B2* | 7/2015 | Grossemy | ............... | G06F 21/31 |
| 10,848,476 B2* | 11/2020 | Durham, III | ............ | H04L 63/08 |
| 11,328,356 B1* | 5/2022 | Slowiak | ................... | G06F 21/31 |
| 2007/0107050 A1* | 5/2007 | Selvarajan | ............. | G06F 21/31 713/182 |
| 2013/0091056 A1* | 4/2013 | Thomas | ................. | G06Q 40/02 705/42 |

(Continued)

FOREIGN PATENT DOCUMENTS

WO WO-2016206090 A1 * 12/2016

*Primary Examiner* — Boris D Grijalva Lobos
(74) *Attorney, Agent, or Firm* — Ice Miller LLP; Richard Cruz

(57) ABSTRACT

In some examples, a computing system may include one or more processors and a memory that includes instructions. Additionally, the one or more processors may execute the instructions to receive, from a user device, a request to create an account, and, in response to receiving the request, transmit a first message to the user device. Moreover, the one or more processors may execute the instructions to receive additional identifiable data received from the user device and implement a set of confirmation operations that includes verifying at least the additional identifiable data based on third-party data. Further, the one or more processors may execute the instructions to, based at least on the verification of at least the additional identifiable data, implement a second set of operations that cause the one or more processors to generate the account including one or more account related features specified by the user.

20 Claims, 18 Drawing Sheets

(56) References Cited

U.S. PATENT DOCUMENTS

| | | | |
|---|---|---|---|
| 2014/0150068 A1* | 5/2014 | Janzer | H04L 63/10 726/4 |
| 2014/0270401 A1* | 9/2014 | Irwin | G06Q 20/405 382/115 |
| 2017/0324762 A1* | 11/2017 | Chow | H04L 69/22 |
| 2021/0158339 A1* | 5/2021 | Tollo | G06Q 20/3829 |

* cited by examiner

SYSTEMS AND METHODS FOR SECURE AND REMOTE ONBOARDING

CROSS-REFERENCE TO RELATED APPLICATION

This application claims the benefit of priority under 35 U.S.C. § 119(e) to prior U.S. Application No. 63/304,964, filed Jan. 31, 2022, the disclosure of which is incorporated by reference herein to its entirety.

TECHNICAL FIELD

The present disclosure generally relates to remotely and securely enabling a user to collaboratively open an electronic account.

BACKGROUND

In some examples, assisted onboarding management computing systems require complete in person participation from both a user and a representative at an on-site institution for a user to open an account (or engage in any other onboarding activities). For example, in the context of an institution, such as a banking facility, users and banking representatives are both required to be on-site to facilitate opening a banking account as a way of ensuring regulatory compliance, user authentication and security. In conventional processes, banking representatives, such as account representatives, manage the flow of onboarding task(s) and the user plays a passive role. Additionally, conventional onboarding processes are manual and/or hybrid, in that they require either that the user physically complete certain procedures (e.g., paperwork) or that the user share a computing device or peripheral with the banking representative at the facility to digitally obtain the needed information. In instances where the conventional onboarding process is a hybrid onboarding process, the hybrid process may require a user and a banking representative to be physically in the same location so that they may share (i.e., each enter data into) a computing device or peripheral of the banking representative for authentication purposes. In another instance, as part of an auditing process, the conventional hybrid onboarding process may include evaluating to confirm that the user was physically present and interacted with the computing device or peripheral of the banking representative. Such evaluations may attempt to ensure that security and authentication protocols have been adhered to.

In examples where the user and the banking representative utilize a computing device or peripheral when performing one or more portions of the conventional onboarding processes, the computing device or peripheral may be hardcoded with software that may not be easily updated to adapt to any changes that may be made to the onboarding process. Further, the computing device or peripheral may not be removed from the institution due to the lack of technical connectivity and/or interfacing systems that would allow the users and the banking representatives to collaborate remotely and securely to conduct onboarding activities in real time. As such, the portions of the conventional onboarding process that may be performed utilizing a computing device or peripheral, may require the user to be on site when interacting with the computing device or peripheral.

Accordingly, there is a need for new types of systems, methods and computer program products that not only replace the antiquated onboarding technology discussed above, but also improve upon and provide new features, functions and efficiencies that do not currently exist and are not currently possible in respect of conventional onboarding technology.

SUMMARY

According to one aspect a computing system may comprise one or more processors and a memory that includes instructions. Additionally, the one or more processors may execute the instructions to receive, from a user device, a request to create an account. In some examples, the request may include preliminary identifiable data of a user operating the user device. Moreover, the one or more processors may execute the instructions to, in response to receiving the request, transmit a first message to the user device. In some examples, the first message may cause the user device to generate, on a graphical user interface (GUI) displayed on the user device, a prompt requesting additional identifiable data associated with the user operating the user device. Further, the one or more processors may execute the instructions to receive additional identifiable data received from the user device and implement a set of confirmation operations that includes verifying at least the additional identifiable data based on third-party data. The one or more processors may execute the instructions to, based at least on the verification of at least the additional identifiable data, implement a second set of operations that cause the one or more processors to generate the account including one or more account related features specified by the user.

According to another aspect a non-transitory, machine-readable storage medium storing instruction that, when executed by at least one processor of a server, may cause the at least one processor to perform operations that include receiving, from a user device, a request to create an account. In some examples, the request may include preliminary identifiable data of a user operating the user device. Moreover, the at least one processor of the server may perform operations that include, in response to receiving the request, transmitting a first message to the user device. In some examples, the first message may cause the user device to generate, on a graphical user interface (GUI) displayed on the user device, a prompt requesting additional identifiable data associated with the user operating the user device. Further, the at least one processor of the server may perform operations that include receiving additional identifiable data received from the user device and implementing a set of confirmation operations that includes verifying at least the additional identifiable data based on third-party data. The at least one processor of the server may perform operations that include, based at least on the verification of at least the additional identifiable data, implementing a second set of operations that cause the one or more processors to generate the account including one or more account related features specified by the user.

According to another aspect a computer-implemented method may include receiving, from a user device, a request to create an account. In some examples, the request may include preliminary identifiable data of a user operating the user device. Moreover, the computer-implemented method may include, in response to receiving the request, transmitting a first message to the user device. In some examples, the first message may cause the user device to generate, on a graphical user interface (GUI) displayed on the user device, a prompt requesting additional identifiable data associated with the user operating the user device. Further, the computer-implemented method may include receiving additional identifiable data received from the user device and implementing a set of confirmation operations that includes verifying at least the additional identifiable data based on third-party data. The computer-implemented method may include, based at least on the verification of at least the additional identifiable data, implementing a second set of operations that cause the one or more processors to generate the account including one or more account related features specified by the user.

DETAILED DESCRIPTION

Figure 1:
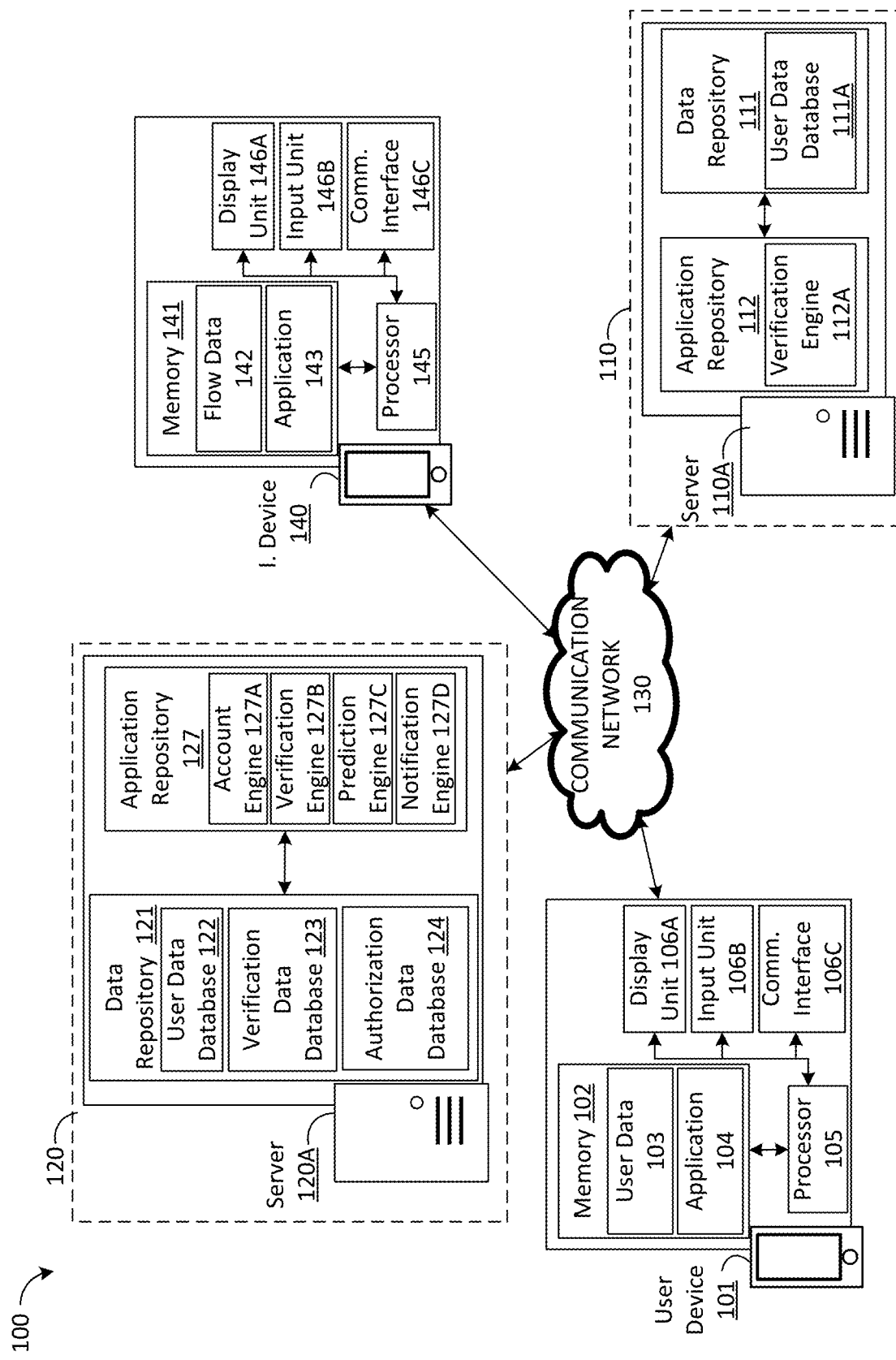
FIG. 1 is a block diagram of an exemplary computing environment, in accordance with some exemplary embodiments.

The present disclosure relates to systems, methods and computer program products for secure and collaborative account creation, product/service enrollment and/or establishment of other related products and/or services (e.g., credit card, debit card, line of credit, loan, etc.) (collectively, 'onboarding') that enables a user to create, open, establish, enroll, request, close, modify, etc. a fully compliant product or service (collectively, an 'account') in real-time with a representative/institution system that is geographically remote from the user, through a unique integration and collaboration between multiple systems via one or more networks. In some implementations, the system may be accessible via a user's mobile communication device (e.g., via a client application on the user device), although it may also be accessible via other types of devices. In some examples, the disclosed systems, methods and computer program products may be implemented in the context of any type of institution. Examples of types of institutions the disclosed systems, methods and computer program products may be applied to, include, but are not limited to, a financial/banking institution, vehicle dealership, academic institution, motor vehicle registration centers, and voting registrar/institution.

A. Exemplary Computing Environments

Recognizing the foregoing challenges, the present disclosure now describes systems, methods and computer program products that provide techniques for overcoming the deficiencies of conventional assisted onboarding management systems by providing the networks, connectivity, and other technical advances that enable fully remote, virtual, and/or collaborative onboarding and account opening processes, while improving security and authentication. In systems, methods and computer program products of the present disclosure, users and representatives of an institution are freed from the constraints of having to be in the same geographical location, the need to complete the onboarding process on a set time schedule (e.g., all at once), and the need to share the same computing device(s) to conduct said onboarding, or any related processes/transactions. Indeed, the systems, methods and computer program products described herein leverage dynamic graphical user interfaces (GUIs), advanced security protocols, and machine learning techniques in order to provide a fully remote, secure, and interactive onboarding and account opening functionality. In some examples, the machine learning and artificial learning techniques may be used to automate some of the processes. In addition, machine learning and artificial learning techniques may be used to enhance security, customize/modify and configure one or more software or hardware components, and/or predict user activity based on training data refined on data gathered from user activity associated with similarly situated users. Training data for the machine learning model(s) of the present disclosure may comprise historical data and/or real-time data pulled from any number of connected systems and sources.

FIG. 1, illustrates a block diagram of example computing environment 100 that includes, among other things, one or more computing systems, such as institution computing system 120, third-party computing system 110, and one or more user devices, such as user device 101. Each of the one or more computing systems, such as institution computing system 120 and third-party computing system 110, and one or more user devices (e.g., user device 101) may each be operatively connected to, and interconnected across, one or more communications networks, such as communications network 130. Examples of communications network 130 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the computing devices and computing systems operating within computing environment 100 may perform operations that establish and maintain one or more secure channels of communication across communications network 130, such as, but not limited to, a transport layer security (TLS) channel, a secure socket layer (SSL) channel, or any other suitable secure communication channel.

As illustrated in FIG. 1, institution system 120 may be operated by or associated with a financial institution, such as a banking institution. Additionally, institution computing system 120, may include one or more servers, such as server 120A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of institution computing system 120 may include server 120A having one or more processors configured to execute portions of the stored code, application engines or modules, or application programs maintained within the one or more tangible, non-transitory memories.

In some instances, institution computing system 120 may correspond to a discrete computing system, although in other instances, institution computing system 120 may correspond to a distributed computing system having multiple, computing components distributed across an appropriate computing network, such as communications network 130 of FIG. 1, or those established and maintained by one or more cloud-based providers, such as Microsoft Azure™ Amazon Web Services™, or another third-party, cloud-services provider. Further, institution computing system 120 may also include one or more communications interfaces, such as one or more wireless transceivers, coupled to the one or more processors for accommodating wired or wireless internet communication across communications network 130 with other computing systems and devices operating within computing environment 100 (not illustrated in FIG. 1).

As described herein, institution computing system 120 may perform any of the exemplary functions and/or processes described herein to, among other things, host, store, maintain and operate a platform or software application for enabling remote and dynamic collaboration of one or more users that are remote from each other, such as application 104 and application 143. The platform may enable dynamic collaboration via an interactive graphical user interface (GUI) capable of receiving input in real-time, and simultaneously from one or more users. Additionally, the platform may enable institution computing system 120 to receive identifiable information or data of the one or more users, such as user of user device 101. Examples of identifiable information of each of the one or more users include, a corresponding social security number, a corresponding name, corresponding address(es), corresponding credit scores, corresponding transaction history, criminal records, corresponding background information, corresponding biometric data, corresponding phone number(s), corresponding email address(es), corresponding demographic information, corresponding financial information, corresponding work information, and authentication documents (e.g., a driver's license, an identification card, biometric scan, etc.). Based on the identifiable information of the one or more users, institution computing system 120 may perform any of the exemplary processes associated with an account with each of the one or more users. Examples of such processes include populating and creating, opening, establishing, enrolling, requesting, closing, and/or modifying the associated account. To facilitate the performance of these exemplary processes, institution computing system 120 may maintain within the one or more tangible, non-transitory memories, such as data repository 121 that includes, but is not limited to user data database 122, verification data database 123, and authorization data database 124.

User data database 122 may include user data of each of a plurality of users. In some instances, the user data may include data associated with and characterizing users of the institution, such as a financial institution. In other instances, the user data may include data associated with and characterizing users seeking or requesting for an account to be established with the institution. In either instance, the user data may include data identifying and characterizing identifiable information obtained or received from a corresponding user device of the corresponding user.

Additionally, user data database 122 may include account data of one or more of the plurality of users. Additionally, account data of each of the one or more users may identify and characterize account information of the corresponding user. Examples of account information of a corresponding user may include, corresponding security information or credentials (e.g., pin number, phone number, or security election), information of one or more account related features, such as user preferences associated with the account and/or one or more products or instruments issued by the institution. In instances where the institution is a financial institution, the information of the one or more products or instruments may be information of one or more financial products or instruments issued by the financial institution. In such instances, the information of the one or more financial products or instruments may include, for each of the financial products issued to corresponding ones of the users, one or more identifiers of the financial product or instrument (e.g., an account number, expiration data, card-security-code, etc.), one or more unique user identifiers (e.g., an alphanumeric character string, such as a login credential, a user name, etc.), and additional information characterizing a balance or current status of the financial product or instrument (e.g., payment due dates or amounts, delinquent accounts statuses, etc.).

Moreover, verification data database 123 may include verification data. In some examples, verification data may include data, such as identifiable data of a user, obtained from third-party computing system 110. As described herein, institution computing system 120 may utilize such verification data to verify or determine whether the identifiable data of a particular user obtained from a user device of the particular user, such as user device 101, matches. Further, authorization data database 124 may include authorization data received from a device operated by a representative of the institution, such as institution device 140. The authorization data may indicate whether the representative of the institution authorizes the generation or creation of an account of a user requesting that such account be created.

Further and to facilitate the performance of any of the exemplary processes described herein, institution computing system 120 may include server 120A that may maintain within one or more tangible non-transitory memories, an application repository 127. As illustrated in FIG. 1, application repository 127 may include, among other things, account engine 127A, verification engine 127B, prediction engine 127C and notification engine 127D. In some examples, account engine 127A may be executed by one or more processors of server 120A to obtain from a user device, such as user device 101 operated by a user, a request to create an account associated with the user. In some instances, the request may include a first set of or preliminary identifiable data of the user. In such instances, executed account engine 127A may parse and obtain the first set of identifiable data. In various instances, executed account engine 127A may utilize the first set of identifiable data to generate or create an account associated with the requesting user.

Additionally, executed account engine 127A may cause the user device, such as user device 101, to prompt the user of the user device to provide additional or a second set of identifiable data of the user to institution computing system 120. In some examples, executed account engine 127A may cause the user device of the user to prompt the user to provide the second set of identifiable data in response to and based on the obtained or received request. For example, in response to receiving the request from user device 101, executed account engine 127A may trigger or signal notification engine 127D to generate a first message or a prompt message that includes prompt data. As described herein, notification engine 127D may be executed by the one or more processors of server 120A. Additionally, executed notification engine 127D may generate and transmit the prompt message including the prompt data to user device 101. In response to and based on the prompt message, a platform or software application, such as application 104, executing on user device 101 may utilize the prompt data of the prompt message to generate and present a dynamic and interactive graphical user interface (GUI) on a display of user device 101, such as display unit 146A. The GUI may include a prompt requesting the user of user device 101 to provide, via input unit 146B and through the platform, additional identifiable data, such as a user's name, a user's street address, a user's Social Security number, etc.

In some instances, the prompt may request for the user to submit authentication documents (e.g., a driver's license, an identification card, biometric scan, etc.) that may be captured via a camera associated with or communicatively connected to the user device. Based on one or more inputs of the user via an input unit of the user device, such as the input unit 146B, and/or additional peripherals communicatively coupled to the user device (e.g., the camera), the platform may obtain the additional identifiable data.

Further, the platform may generate a second message or update message that includes one or more portions of the additional identifiable data or second set of identifiable data and transmit the update message to institution computing system 120. As described herein, executed account engine 127A may utilize the one or more portions of the additional identifiable data to generate or create an account associated with the user of the user device. In some instances, executed account engine 127A may store identifiable data of the user, such as the first set of identifiable data of the user and the second set of identifiable data of the user, within corresponding portions of data repository 121, such as user data database 122.

As illustrated in FIG. 1, verification engine 127B may be executed by one or more processors of server 120A to verify the identifiable data of a particular user, such as the first set of identifiable data of the particular user and/or the second set of identifiable data of the particular user. In some examples, executed verification engine 127B may verify the identifiable data of the particular user. In such examples, executed verification engine 127B may generate a request for information of the particular user and transmit the request to a third-party computing system, such as third-party computing system 110. The request may include data or information identifying the particular user and/or information or data identifying the identifiable data executed verification engine 127B is verifying. Based on the request, the third-party computing system may obtain corresponding user data stored and/or maintained by the third-party computing system. Additionally, the third-party computing system may transmit the corresponding user data stored and/or maintained by the third-party computing system to institution computing system 120. As described herein, the user data stored and/or maintained by the third-party computing system may include data, such as identifiable data, of the particular user. Executed verification engine 127B may obtain the user data stored and/or maintained by the third-party computing system and determine whether the user data stored and/or maintained by the third-party computing system matches with the identifiable data of the user obtained from the user device of the user, such as the first set of identifiable data and/or the second set of identifiable data. In examples where executed verification engine 127B determines the user data stored and/or maintained by the third-party computing system and the identifiable data of the user obtained from the user device match, executed verification engine 127B may determine the identifiable data of the user obtained from the user device is correct or accurate. In some instances, executed verification engine 127B may generate data indicating that the identifiable data of the user obtained from the user device is correct or accurate.

In examples where executed verification engine 127B determines the user data stored and/or maintained by the third-party computing system and the identifiable data of the user obtained from the user device do not match, executed verification engine 127B may determine the identifiable data of the user obtained from the user device is incorrect or unverifiable. Additionally, executed verification engine 127B may generate data indicating that the identifiable data of the user obtained from the user device is incorrect or unverifiable. In some instances, executed verification engine 127B may store the user data stored and/or maintained by the third-party computing system, such as the third-party computing system 110 and the data indicating whether the identifiable data of the user obtained from the user device is correct, within corresponding portions of data repository 121, such as verification data database 123.

In other instances, based on executed verification engine 127B determining the user data stored and/or maintained by the third-party computing system and the identifiable data of the user obtained from the user device do not match, executed verification engine 127B may cause the user device of the user, such as user device 101, to prompt the user to provide additional authentication information or documentation. For example, in response to executed verification engine 127B determining the user data stored and/or maintained by the third-party computing system and the identifiable data of the user obtained from the user device do not match, executed verification engine 127B may trigger or signal executed notification engine 127D to generate a third message or another prompt message that includes additional prompt data. Additionally, executed notification engine 127D may transmit the third message including the additional prompt data to the user device 101. In response to and based on the third message including the additional prompt data, the platform executing on user device 101 may utilize the additional prompt data within the third message to generate and present an additional prompt on the dynamic and interactive GUI. The additional prompt may request and enable the user of user device 101 to complete one or more tasks. Examples of the one or more tasks may include submitting additional authentication information or documents (e.g., an additional identification card if initially the driver's license of the user is determined to be unverifiable).

In some instances, the additional prompt (or any prompt generated by the platform) may be a push notification, pop-up alert, a notification, a dynamic modification of a specific region of the GUI displayed on a display of a user device, such as display unit 146A etc. In other instances, the additional prompt may indicate a particular time period within which the one or more tasks are to be completed. In various instances, the additional prompt may request and enable the user to complete the one or more tasks over any number of time periods. For instance, the additional prompt may cause the platform or application 104 to push a prompt to a GUI of application 104 displayed on display unit 146A. The prompt may request the user of user device 101 to complete a task related to submitting additional authentication documents, e.g., another identification card. Additionally, the prompt may indicate that the user may respond to the prompt at a later point in time (e.g., hours, minutes, or days later). Further, in instances where a predetermined amount of time has elapsed without receiving a response from the user device of the user, such as the requested additional authentication information or documents, institution computing system 120 may save and store the progress made up to that point. As such, once the response (e.g., the requested additional authentication information or documents) is received by the platform, the platform may transmit the response back to institution computing system 120. The institution computing system 120 may proceed with verifying the obtained additional authentication information or documents.

In other examples, executed verification engine 127B may transmit one or more portions of the obtained the identifiable data of the particular user to one or more other computing systems, such as third-party computing system 110, configured to verify the identifiable data of a particular user. In such examples, executed verification engine 127B may generate a verification request to verify the identifiable data of the particular user. The request may include portions of identifiable data of the particular user obtained from a corresponding user device. As described herein, the other computing system(s), such as third-party computing system 110, may determine whether the identifiable data of the particular user included in the verification request matches user data maintained and/or stored in the other computing system(s). Additionally, the other computing system(s) may generate verification data indicating whether the identifiable data of the particular user included in the request matches the user data maintained and stored in the other computing system(s). Moreover, the other computing system(s) may transmit the verification data to institution computing system 120 and institution computing system 120 may determine whether the obtained identified data of the particular user is correct or incorrect/unverifiable based on the verification data. For instance, institution computing system 120 may determine the obtained identified data of the particular user is correct based on the verification data indicating the identifiable data of the particular user included in the request matches data maintained and stored in the other computing system(s). Additionally, executed verification engine 127B may generate data indicating that the identifiable data of the user obtained from the user device is correct or accurate.

Alternatively, institution computing system 120 may determine the obtained identified data of the particular user is incorrect/unverifiable based on the verification data indicating the identifiable data of the particular user included in the request does not match the data maintained and stored in the other computing system(s). Additionally, executed verification engine 127B may generate data indicating that the identifiable data of the user obtained from the user device is incorrect/unverifiable. In some instances, executed verification engine 127B may store the verification data indicating whether the identifiable data of the particular user included in the request matches the data maintained and stored in the other computing system(s) and the data indicating whether the identifiable data of the user obtained from the user device is correct, within corresponding portions of data repository 121, such as verification data database 123. In other instances, as described herein, based on executed verification engine 127B determining the identifiable data of the user obtained from the user device is incorrect/unverifiable, executed verification engine 127B may cause the user device of the user, such as user device 101, to prompt the user to provide additional authentication information or documentation.

Referring back to FIG. 1, executed verification engine 127B may update the GUI displayed on a display of a user device of the user requesting an account be created or generated by institution computing system 120, such as display unit 106A of user device 101. In some examples, the GUI displayed on the display of the user device may include one or more fields, such as fields of an interactive form, that the requesting user may manually populate. In other examples, institution computing system 120 may automatically populate the one or more fields, in response to determining the identifiable data of the user is correct. In such examples, executed verification engine 127B may generate a fourth message or GUI message. Additionally, executed verification engine 127B may package within portions of the GUI message one or more portions of the identifiable data of the user that was determined as being correct, such as one or more portions of the first set of identifiable data and/or one or more portions of the second set of identifiable data. Moreover, executed verification engine 127B may transmit the GUI message including the one or more portions of identifiable data of the user to the user device of the user, such as user device 101. The user device may parse and obtain the one or more portions of identifiable data of the user and automatically fill corresponding fields of the displayed GUI. For instance, the one or more portions of the identifiable data may include a residential address of the requesting user. Additionally, the platform or application 104 executing on the user device 101 may automatically fill fields associated with a residential address with the residential address of the user of user device 101. Further, the GUI message may cause the platform executing on the user device to prompt the requesting user operating the user device to indicate whether the fields populated automatically by the platform are accurate. The user may utilize the platform to generate a confirmation message including data indicating whether the fields populated automatically by the platform are accurate. The user device may transmit, to institution computing system 120, the confirmation message including the data indicating whether the fields populated automatically by the platform are accurate or correct In various examples, executed account engine 127A may cause a platform executing on a user device of a requesting user, such as application 104 of user device 101, to prompt the user of the user device to provide security information or credentials (e.g., a username and password), a selection of one or more account related features (e.g., user preferences account and/or one or more services or products to associate with the account), and in some instances, a security election (e.g., a user pin number to associate with the account and/or user preferences related to two factor authentication, such as a phone number, an email address, and/or messaging preferences). As described herein, examples of the one or more account related features may include user preferences associated with the account and/or one or more products or instruments issued by the institution. For example, in response to obtaining, from user device 101, the confirmation message, executed account engine 127A may generate a fourth message and package additional prompt data. Additionally, executed account engine 127A may transmit the fourth message to user device 101. In response to and based on the fourth message including the prompt data, application 104 executing on user device 101 may utilize the prompt data within the message to generate and present a dynamic and interactive graphical user interface (GUI) on a display of the user device, such as display unit 146A. The GUI may include a prompt requesting the user of user device 101 to provide, via input unit 146B, security information or credentials, a selection of one or more account related features, and in some instances, a security election. Additionally, user may provide, via input unit 106B, one or more inputs corresponding to the login credentials, the selection of the one or more account related features, and in some instances, the security election. The platform may generate a message and package within portions of the message data identifying and characterizing the inputted login credentials, the selection of the one or more account related features, and in some instances, the security election. Further, the platform may transmit to institution computing device 120 the message including data identifying and characterizing the inputted login credentials, the selection of the one or more account related features, and in some instances, the security election.

Referring back to FIG. 1, executed account engine 127A may perform operations that create an account for the requesting user based on the message including data identifying and characterizing the inputted login credentials, the selection of the one or more account related features, and in some instances, the security election. In some examples, executed account engine 127A may generate the account of the requesting user upon receiving an authorization indication from an institution device operated by a representative of the institution, such as institution device 140. In some instances, a representative of the institution operating the institution device, may utilize an input unit of the institution device, such as input unit 146B, to authorize the creation or generation of the requested account. In other instances, a platform executing on the institution device, such as application 143, may automatically determine whether to authorize the creation or generation of the requested account. In either instances, executed account engine 127A may transmit data identifying and characterizing the inputted security information or credentials, the selection of the one or more account related features, and in some instances, the security election, to the institution device. The representative of the institution and/or the platform, such as application 143, may determine whether to authorize the creation or generation of the requested account based on the data identifying and characterizing the inputted security information or credentials, the selection of the one or more account related features, and in some instances, the security election. As described herein, the created or generated account data of the requested user may be based on the data on a display of the institution device. Additionally, the account data may identify and characterize an account information of the requesting user, such as the corresponding security information or credentials (e.g., pin number, phone number, or security election), information of one or more account related features, such as user preferences associated with the account and/or one or more products or instruments issued by the institution, and in some instances the security election.

As illustrated in FIG. 1, prediction engine 117C may be executed by one or more processors of server 120A to monitor the usage and interactions between a user of a user device, such as user device 101, and the platform executing on the user device. As described herein, the platform may generate and transmit, to institution computing system 120, engagement data identifying and characterizing one or more interactions or activities between the user and the platform. The engagement data may identify and characterize the interactions or activities (e.g., interface elements or features the user interacts with), a timestamp of the occurrence of each interaction, and products or instruments the interface elements or features are associated with (e.g., setting an online account, adding users to the account, electronically signing documents, opting in or opting out of agreement terms or services, establishing overdraft line of credit, set up automatic bill pay process for one or more products or instruments, etc.). Additionally, executed prediction engine 127C may perform operations that customize/modify or configure one or more software components, such as the GUI of the platform displayed on the user device of the monitored user (e.g., causing a prompt to be displayed or rearranging one or more interface elements or features of the GUI), such as display unit 106A based on the engagement data of the monitored user and one or more machine learning processes.

In some examples, executed prediction engine 127C may utilize the one or more machine learning processes to rearrange the interface elements or features of the GUI. For example, executed prediction engine 127C may apply a machine learning process to the engagement data or provide the engagement data as input into the machine learning process to determine which interface element or feature of a products or instruments the user utilizes the most. Based on such determinations, executed prediction engine 127C may trigger or signal executed notification engine 117D to generate a message including interface data indicating which interface element or feature to rearrange and a position or location of the GUI to rearrange the indicated interface element or features to (e.g., move to the top of the GUI). Executed notification engine 117D may transmit the message including the interface data to the user device of the monitored user and the platform executing on the user device of the monitored user may rearrange the interface element or feature indicated in the interface data based on the interface data. In another example, executed prediction engine 127C may apply a machine learning process to the engagement data as well as data indicating the time sensitive nature of each of the products or instruments the institution provides to determine which interface element or feature of a products or instruments is of highest priority to the particular monitored user. Based on such determinations, executed prediction engine 127C may trigger or signal executed notification engine 117D to generate a message including interface data indicating which interface element or feature to rearrange and a position or location of the GUI to rearrange the indicated interface element or features to (e.g., move to the top of the GUI). Executed notification engine 117D may transmit the message including the interface data to the user device of the monitored user and the platform executing on the user device of the monitored user may rearrange the interface elements or features indicated in the interface data based on the interface data. The rearranged interface element or feature may be presented more prominently to the user (e.g., at the top of the GUI) as to encourage the user to complete certain tasks associated with products or instruments corresponding to the rearranged interface element or feature.

In other examples, executed prediction engine 127C may utilize the one or more machine learning processes to predict future user activity and/or to trigger the GUI to display a prompt or instructions for the user to interact with the GUI in a particular manner. For example, executed prediction engine 127C may apply a machine learning process to engagement data of a monitored user to identify a product or instrument the monitored user may be interested in a future time interval. Based on such determinations, executed prediction engine 127C may trigger or signal executed notification engine 117D to generate a message including interface data. The interface data may indicate a prompt, interface element and/or feature associated with the identified product or instrument to present or display on the GUI. Executed notification engine 117D may transmit the message including the interface data to the user device of the monitored user and the platform executing on the user device of the monitored user may display the prompt, interface element and/or of the interface data. In some instances, the prompt may instruct the monitored user to perform a number of tasks in order for the monitored user to sign up or activate the identified product or instrument. In other instances, the number of tasks may refer to the interface element and/or feature associated with the instrument or product the monitored user is to engage or interact with.

In various examples, executed prediction engine 127C may utilize a machine learning process to update and refine the one or more machine learning process and/or associated training data. For example, executed prediction engine 127C may provide as input, the engagement data of the monitored user, to a machine learning process configured to further refine one or more machine learning processes configured to determine which interface elements or features are most important to the monitored user, and update training data associated with one or more other machine learning processes. In another example, executed prediction engine 127C may provide as input, the engagement data of the monitored user, to a machine learning process configured to further refine one or more machine learning processes configured to predict future user activity and/or to trigger the GUI to display a prompt or instructions for the user to interact with the GUI in a particular manner, and update training data associated with one or more other machine learning processes. The results of applying the machine learning process(es) may be to enhance security protocols, dynamically adjust the display of features on the interactive GUI, or to reduce latency in communication between the user device and the institution server system (and its corresponding devices) by routing communications through communication devices with the least amount of traffic.

Referring back to FIG. 1, the institution computing system 120 may be in communication with one or more third-party computing systems, such as third-party computing system 110, to verify identifiable information of one or more users. As described herein, the one or more third-party computing systems, such as third-party computing system 110, may be operated by one or more entities, including but not limited to, credit bureaus, government entities, personal information analytics firms, just to name a few. Additionally, the one or more third-party server systems may represent a computing system that includes one or more servers, such as server 110A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of third-party computing system 110 may include server 110A having one or more processors configured to execute portions of the stored code, application engines or modules, or application programs maintained within the one or more tangible, non-transitory memories.

To facilitate the performance of verifying identifiable information of the one or more users, the one or more third-party computing systems, such as third-party computing system 110, may maintain within the one or more tangible, non-transitory memories, such as data repository 111 that includes, but is not limited to user data database 111A. User data database 111A may include user data of one or more users, such as the one or more requesting users. Additionally, the user data may include personally identifiable information. Examples of personally identifiable information include social security numbers, names, addresses, credit scores, transaction history, criminal records, background information, biometric data, phone numbers, email addresses, demographic information, financial information, and work information. Moreover, the one or more third-party computing systems may communicate directly with a user device, such as user device 101, or institution computing system 120, in response to a request from a requesting user to create an account and/or a request from institution computing system 120 to verifying identifiable information or data of the requesting user.

Further, and to facilitate the performance of any of the exemplary processes described herein, each of the one or more third-party computing systems, such as third-party computing system 110, may include one or more servers, such as server 110A, that may maintain within the one or more tangible non-transitory memories, an application repository 112. The application repository may include, among other things, a verification engine, such as verification engine 112A. The verification engine may be configured to verify identifiable information of one or more users. For example, verification engine 112A may be executed by one or more processors of server 110A to obtain, from institution computing system 120, such as executed verification engine 127B, a request to verify identifiable data or information of a requesting user. In examples where the request includes portions of identifiable data of the requesting user obtained from a corresponding user device, executed verification engine 112A may compare the identifiable data of the requesting user included in the request to the user data of the requesting user stored in user data database 111A. Based on the comparison, executed verification engine 112A may determine whether the identifiable data of the requesting user included in the request matches the corresponding user data stored in user data database 111A. Additionally, executed verification engine 112A may generate verification data indicating whether the identifiable data of the requesting user included in the request matches the corresponding user data stored in user data database 111A. Moreover, the other computing system(s) may transmit the verification data to institution computing system 120 and institution computing system 120, such as executed verification engine 127B, may determine whether the obtained identified data of the requesting user is correct or incorrect/unverifiable based on the verification data. Further, as described herein, executed accounting engine 127A may implement operations, such as creating or generating a user account, based on whether the obtained identified data of the requesting user is correct or incorrect/unverifiable.

Alternatively, in some examples the request may include information identifying the particular user and/or identifiable data institution computing system 120 is verifying. In such examples, executed verification engine 112A may identify, from user data database 111A, user data corresponding to the information included in the request. Additionally, executed verification engine 127B may transmit the identified user data to institution computing system 120. As described herein, institution computing system 120, such as executed verification engine 127B, may verify the identifiable data or information of the requesting user based on a comparison between the identifiable data or information of the requesting user and the identified user data obtained from executed verification engine 112A.

As illustrated in FIG. 1, the institution computing system 120 may be in communication with one or more other computing devices via an ongoing real-time connection, such as one or more user devices (e.g., user device 101) and/or one or more institution devices (e.g., institution device 140). In some examples, the one or more user devices, such as user device 101, may each have one or more tangible, non-transitory memories, such as memory 102, that stores data and/or software instructions, and one or more processors (e.g., processor 105), configured to execute the software instructions. The one or more tangible, non-transitory memories may, in some aspects, store application programs, application engines or modules, and other elements of code executable by the one or more processors. As illustrated in FIG. 1, user device 101 may store within the one or more tangible, non-transitory memories, an executable application 104 or platform, which may be provisioned to user device 101 or any of the one or more user devices.

As described herein, the platform or application 104 may be supported and maintained by institution computing system 120. In some instances, and upon execution by the one or more processors of user device 101, the application 104 may perform any of the exemplary processes described herein to, among other things, display or provide a GUI on display unit 146A of user device 101. As described herein, the GUI of the platform or application 104 may establish communications with institution computing system 120 and enable a user operating user device 101, to request creation of an account with the institution associated with institution computing system 120. Additionally, the GUI of application 104 may enable the user to remotely communicate with institution computing system 120 and transmit identifiable information or data or authentication information or data to institution computing system 120. In some examples, the GUI of application 104 may enable the users of user devices, such as user device 101, to remotely collaborate with one or more institution devices (e.g., institution device 140) to perform one or more activities, such as setup an online banking account with a financial institution and/or predetermined engagement activities (e.g., an action to add authorized users to an account, electronically sign (e.g., e-sign) documents, opt-in or opt-out of agreement terms or service, establish overdraft line of credit, set up an automatic bill pay process with an entity system, etc.) with particular entity systems (e.g., merchants).

Each user device, such as user device 101, may include a display unit, such as display unit 106A, configured to present interface elements to a corresponding user, such as a user of user device 101, and an input unit, such as input unit 106B, configured to receive input from the user (e.g., in response to the interface elements presented through the display unit). By way of example, the display unit may include, but is not limited to, an LCD display unit, a TFT display, and OLED display or other appropriate type of display unit, and input unit may include, but is not limited to, a keypad, keyboard, touchscreen, fingerprint scanner, voice activated control technologies, or appropriate type of input unit. Further, in additional aspects (not illustrated in FIG. 1), the functionalities of the display unit and input unit may be combined into a single device, e.g., a pressure-sensitive touchscreen display unit that presents interface elements and receives input from a user, such as user device 101. In various instances, user device 101 may include an embedded computing device (e.g., in communication with a smart textile or electronic fabric), and any other type of computing device that may be configured to store data and software instructions, execute software instructions to perform operations, and/or display information on an interface device or unit, such as display unit 106A.

Moreover, each user device, such as user device 101, may include a communications interface, such as communications interface 106C, such as a wireless transceiver device, coupled to a processor of user device 101, such as processor 105, and configured by the processor to establish and maintain communications with communications network 130 via one or more communication protocols, such as WiFi®, Bluetooth®, NFC, a cellular communications protocol (e.g., LTE®, CDMA®, GSM®, etc.), or any other suitable communications protocol. In some instances, each of the user devices may also establish communications with one or more additional computing systems or devices operating within computing environment 100 across a wired or wireless communications channel, such as communications network 130 (e.g., via the communications interface 106C using any appropriate communications protocol).

In some instances, each user device, such as user device 101, may be associated with or operable by a user. Examples of user devices may include, but are not limited to, any combination of mobile phones, smart phones, tablet computers, laptop computers, desktop computers, server computers, a personal digital assistant, a portable navigation device, a mobile phone a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), or any other computing device configured to capture, receive, store and/or disseminate any suitable data.

In other examples, the one or more institution devices, such as institution device 140, may each have one or more tangible, non-transitory memories, such as memory 141, that stores data and/or software instructions, and one or more processors (e.g., processor 145), configured to execute the software instructions. The one or more tangible, non-transitory memories may, in some aspects, store application programs, application engines or modules, and other elements of code executable by the one or more processors. As illustrated in FIG. 1, institution device 140 may store within the one or more tangible, non-transitory memories, an executable application 143 or platform, which may be provisioned to institution device 140 or any of the one or more institution devices. In some instances, the institution device, such as institution device 140 may be located geographically proximal or remotely from the components of institution computing system 120. In other instances, the platform or application 143 may be supported and maintained by institution computing system 120. In various instances, and upon execution by the one or more processors of institution device 140, the application 143 may perform any of the exemplary processes described herein to, among other things, display or provide a GUI on display unit 146A of institution device 140.

As described herein and in some instances, the GUI of the platform or application 143 may establish communications with institution computing system 120 and one or more user devices, such as user device 101, via the institution computing system 120, and enable a representative of the institution operating institution device 140, authorize the request to create or generate an account of one or more requesting users. Additionally, the GUI of application 143 may enable the representative of the institution to remotely collaborate with one or more user devices (e.g., user device 101) to perform one or more activities, such as setup an online banking account with a financial institution and/or predetermined engagement activities (e.g., an action to add authorized users to an account, electronically sign (e.g., e-sign) documents, opt-in or opt-out of agreement terms or service, establish overdraft line of credit, set up an automatic bill pay process with an entity system, etc.) with particular entity systems (e.g., merchants). In some examples, the GUI of application 143 may enable the representative of the institution to dynamically edit and share documents in a standardized format contemporaneously with a user of a user device, such as user device 101.

Each institution device, such as institution device 140, may include a display unit, such as display unit 146A, configured to present interface elements to a corresponding representative of the institution, such as a representative of the institution of institution device 140, and an input unit, such as input unit 146B, configured to receive input from the representative of the institution (e.g., in response to the interface elements presented through the display unit). By way of example, the display unit may include, but is not limited to, an LCD display unit, a TFT display, and OLED display or other appropriate type of display unit, and input unit may include, but is not limited to, a keypad, keyboard, touchscreen, fingerprint scanner, voice activated control technologies, or appropriate type of input unit. Further, in additional aspects (not illustrated in FIG. 1), the functionalities of the display unit and input unit may be combined into a single device, e.g., a pressure-sensitive touchscreen display unit that presents interface elements and receives input from a representative of the institution, such as a representative of the institution of institution device 140. In various instances, institution device 140 may include an embedded computing device (e.g., in communication with a smart textile or electronic fabric), and any other type of computing device that may be configured to store data and software instructions, execute software instructions to perform operations, and/or display information on an interface device or unit, such as display unit 146A.

Moreover, each institution device, such as institution device 140, may include a communications interface, such as communications interface 146C, such as a wireless transceiver device/component, coupled to a processor of institution device 140, such as processor 145, and configured by the processor to establish and maintain communications with communications network 130 via one or more communication protocols, such as WiFi®, Bluetooth®, NFC, a cellular communications protocol (e.g., LTE®, CDMA®, GSM®, etc.), or any other suitable communications protocol. In some instances, each institution device may also establish communications with one or more additional computing systems or devices operating within computing environment 100 across a wired or wireless communications channel, such as communications network 130 (e.g., via the communications interface 146C using any appropriate communications protocol).

In some instances, each institution device, such as institution device 140, may be associated with or operable by a user. Examples of institution devices, may include, but are not limited to, any combination of mobile phones, smart phones, tablet computers, laptop computers, desktop computers, server computers, a personal digital assistant, a portable navigation device, a mobile phone a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), or any other computing device configured to capture, receive, store and/or disseminate any suitable data.

In some instances, the GUI of application 104 and GUI of application 143 may enable users of user devices, such as user device 101, and representatives of the institution, such as representatives of the institution of institution device 140, to simultaneously make edits that are perceivable to the representatives as well as the users via their corresponding devices. In other instances, a portion of the GUI of application 104 and GUI of application 143 may be dedicated to real-time communication between a user of a user device, such as user device 101, and a representative of the institution of institution device 140 (e.g., video conferencing and/or instant messaging). In some examples, the GUI of application 104 and GUI of application 143 may enable the user of a user device, such as user device 101, to dynamically edit and share documents in a standardized format contemporaneously with a representative of the institution of institution device, such as institution device 140.

B. Exemplary Processes for Remotely Onboarding a User.

As described herein, institution computing system 120 may maintain and provide a platform, such as application 104 and application 143, that enables a user operating a user device, such as user device 101, to initiate an onboarding process or a process to create an account with institution computing system 120 and a representative of the institution operating an institution device, such as institution device 140, to complete the onboarding process. In various examples, the user device and the institution device may each be remote from institution computing system 120. Additionally, unlike a conventional computing device or peripheral of the institution that may be hardcoded with software that may not be easily updated to adapt to any changes that may be made to the onboarding process, as described herein, application 104 may each be configured to be customizable or modifiable to a user interacting with application 104 based on the interactions between the user and application 104.

Figure 2:
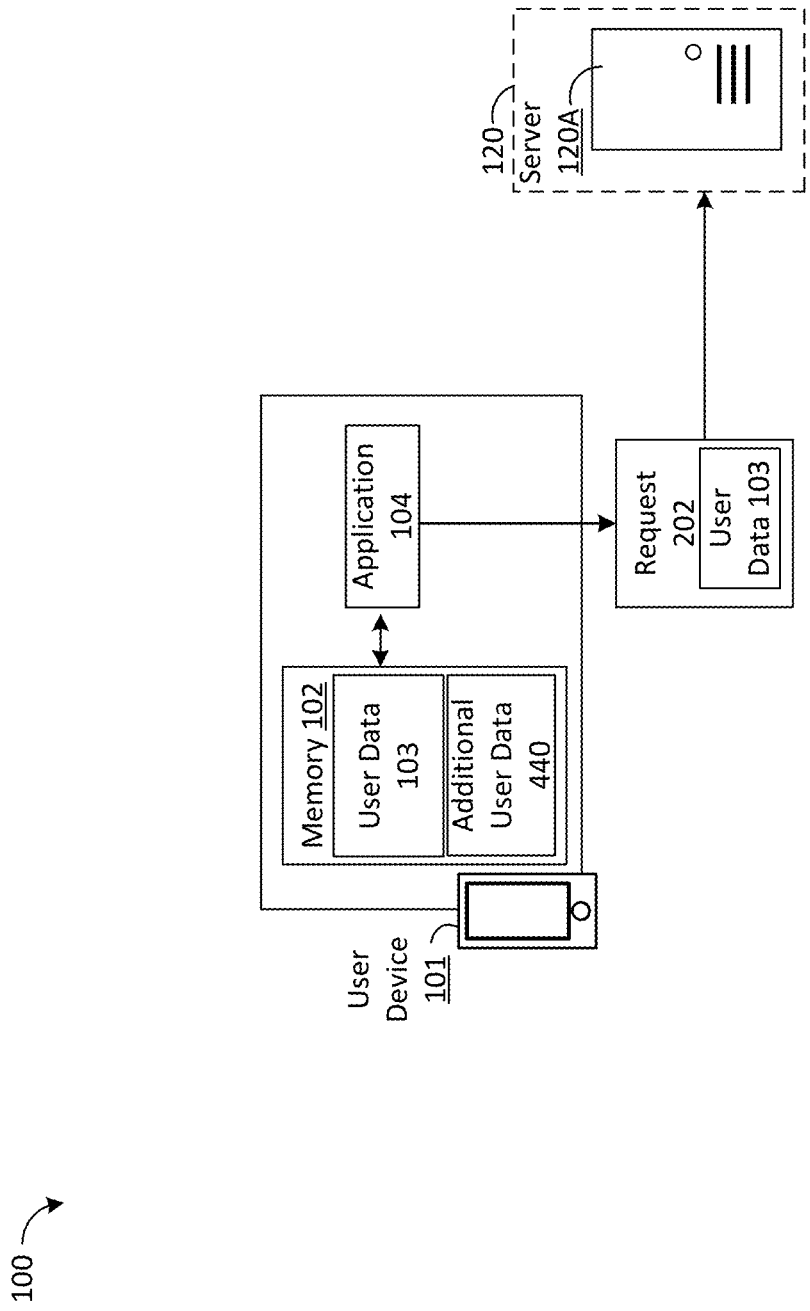
FIGS. 2-11 are block diagrams illustrating a portion of an exemplary computing environment, in accordance with some exemplary embodiments.

In some examples, as illustrated in FIG. 2, user device 101 may transmit, to institution computing system 120, request 202 including user data 103. As described herein, user data 103 may include identifiable data or information of a user operating user device 101. Additionally, request 202 may comprise a request for opening, creating or generating an account with an institution, such as a financial institution. In some examples, application 104 may be maintained and supported by institution computing system 120. Additionally, based on one or more inputs provided, via input unit 146B, by a user of user device 101, the one or more processors of user device 101, such as processor 105, may execute application 104. Moreover, based on additional inputs provided, via input unit 146B, by the user of user device 101, executed application 104 may obtain one or more portions of user data 103. As described herein, the one or more portions of user data 103 may include a first set of identifiable data or information of the user operating user device 101. In some instances, and as illustrated in FIG. 2, executed application 104 may obtain the one or more portions of user data 103 from memory 102. In other instances, not illustrated in FIG. 2, executed application 104 may obtain the one or more portions of user data 103 directly from a GUI of executed application 104. The GUI may be displayed on display unit 106A and may be obtained from one or more inputs provided by the user of user device 101 via input unit 106B. Further, executed application 104 may generate request 202 and package within portions of request 202, the one or more portions user data 103. Executed application 104 may transmit request 202, along with the one or more portions of user data 103, to server 120A of institution computing system 120.

As described herein, application 104 or the platform, may enable dynamic collaboration via an interactive graphical user interface (GUI) capable of receiving input in real-time, and simultaneously from one or more users. Additionally, institution computing system 120 may, via application 104, provide a prompt, via a GUI of application 104, for one or more tasks or notifications. In some instances, the tasks may be associated with a request for additional identifiable data/information or authenticating information/documents. In such instances, application 104 may enable institution computing system 120 to request and receive the requested identifiable information/data or authenticating documents/information of the one or more users via a corresponding user device, such as user device 101. Examples of identifiable information of each of the one or more users may include (among others) a corresponding social security number, a corresponding name, corresponding address(es), corresponding credit scores, corresponding transaction history, criminal records, corresponding background information, corresponding biometric data, corresponding phone number(s), corresponding email address(es), corresponding demographic information, corresponding financial information, corresponding work information, and authentication documents (e.g., a driver's license, an identification card, biometric scan, etc.).

In other instances, the notifications may be associated with at least one of one or more alerts and/or notifications indicating, without being limited to, any updates to an onboarding process, account status, checklists, onboarding requirements, security prompts, current and/or predicted user activity, changes in user activity, benchmark goal progress indications, and the like. For example, institution computing system 120 may, via application 104, provide a prompt or notification, via a GUI of application 104, regarding the progress a user of user device 101 has made in completing certain milestones of a particular task that institution computing system 120 and/or a representative of the institution operating institution device 140 may have set out (e.g., request for additional identifiable data or information).

In various instances, user device 101 may communicate request 202 without utilizing executed application 104. In such instances, based on one or more inputs provided, via input unit 146B, by a user of user device 101, the one or more processors of user device 101, such as processor 105, may generate and transmit, to institution computing system 120, request 202 via one or more forms of communication, such as email or text. Further, in response to receiving request 202, institution computing system 120 may generate and transmit, to user device 101, a message including data that may cause user device 101 to execute application 104. In response to user device 101 receiving the message and parsing, obtaining and processing the data included in the message, user device 101 may execute application 104. In some instances, the message may be a text or email message. In such instances, a link may be provided in the text or email message. The user of user device 101 may cause user device 101 to execute application 104 by interacting (e.g., selecting or clicking) with the link.

In some instances, user device 101 may be geographically remote from institution computing system 120. In other instances, request 202 may include data characterizing opt in (and/or opt out) election information. In such instances, the user may interact with various interface elements of a GUI of executed application 104 to indicate an opt in election information. Executed application 104 may further package data indicating the opt in election information into request 202.

Figure 3:
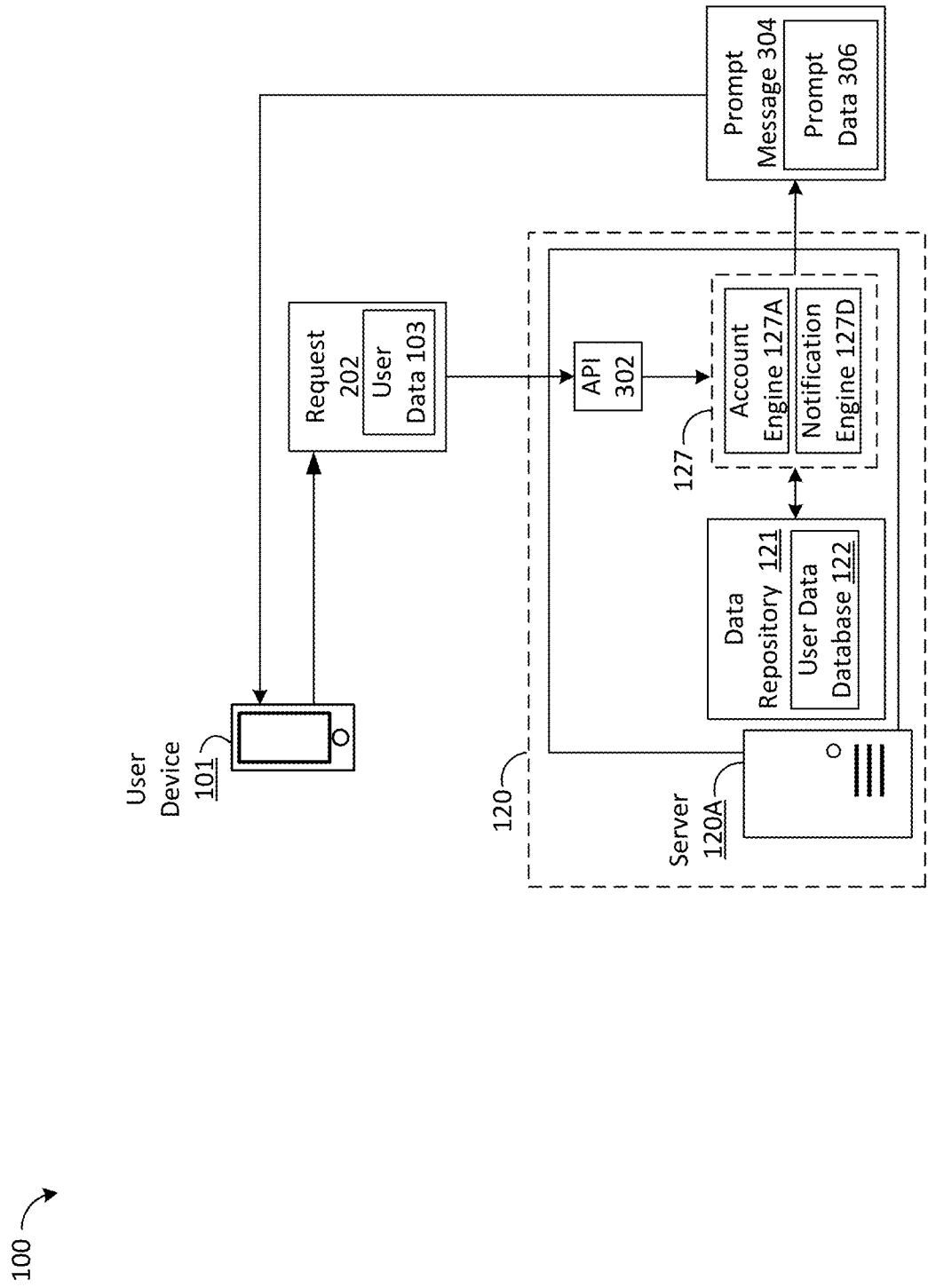

As illustrated in FIG. 3, a programmatic interface established and maintained by server 120A of institution computing system 120, such as application programming interface (API) 302, may receive request 202 that includes user data 103. As described herein, institution computing system 120 may receive request 202 via a channel of communications established programmatically between API 302 and executed application 104 (or any platform or software application executed on any user device requesting to create, open or generate an account). Executed account engine 127A may parse request 202 and obtain user data 103. Further executed account engine 127A may store user data 103 within a corresponding portion of data repository 121, such as user data database 122.

Additionally, in response to receiving request 202, institution computing system 120 may cause executed application 104 to provide a prompt. As described herein, the prompt may establish a real time collaboration connection between user device 101 and institution device 140. Additionally, the prompt may also launch a dynamic interactive GUI on user device 101. By way of example and as illustrated in FIG. 3, in response to executed account engine 127A receiving or obtaining request 202, executed account engine 127A may determine additional identifiable data executed account engine 127A may request to establish, create or generate the requested account for the user of user device 101. In some instance, executed account engine 127A may obtain the first set of identifiable data/information included in user data 103 of request 202. Additionally, based on the first set of identifiable data/information included in user data 103, executed account engine 127A may determine additional identifiable data or information. Examples of additional identifiable data or information that executed account engine 127A may determine based on the first set of identifiable data/information, include one or more of a name of the user, a street address of the user, a Social Security number of the user, or a request for the user to submit authentication documents (e.g., a driver's license, an identification card, biometric scan, etc.) that may be captured via a camera associated with the user device. For instance, the first set of identifiable data/information may include data/information identifying the user of user device 101, such as a name and an address of the user of user device 101. Based on the first set of identifiable data/information, executed account engine 127A may determine that the additional identifiable data/information may include images of an identification document (e.g., an identification card) associated with the user of user device 101. Such determinations may be further based on a predetermined list of requirements associated with the requested task, such as, opening, creating, or generating a new account for the requesting user.

Moreover, executed account engine 127A may generate data indicating the determined additional identifiable data/information and provide such data to executed notification engine 127D. Executed notification engine 127D may generate prompt data 306 including such data. Further executed notification engine 127D may generate prompt message 304 and package one or more portions of prompt data 306 into portions of prompt message 304. Executed notification engine 127D may transmit prompt message 304 to user device 101. In some instances, executed notification engine 127D may perform operations that package, into an additional portion of prompt message 304, elements of layout data that specifies a disposition of, or a visual characteristic of, one or more interface elements that establish a graphical representation of prompt data 306 associated with the determined additional identifiable data/information (e.g., when presented on the GUI by executed application 104).

Figure 4:
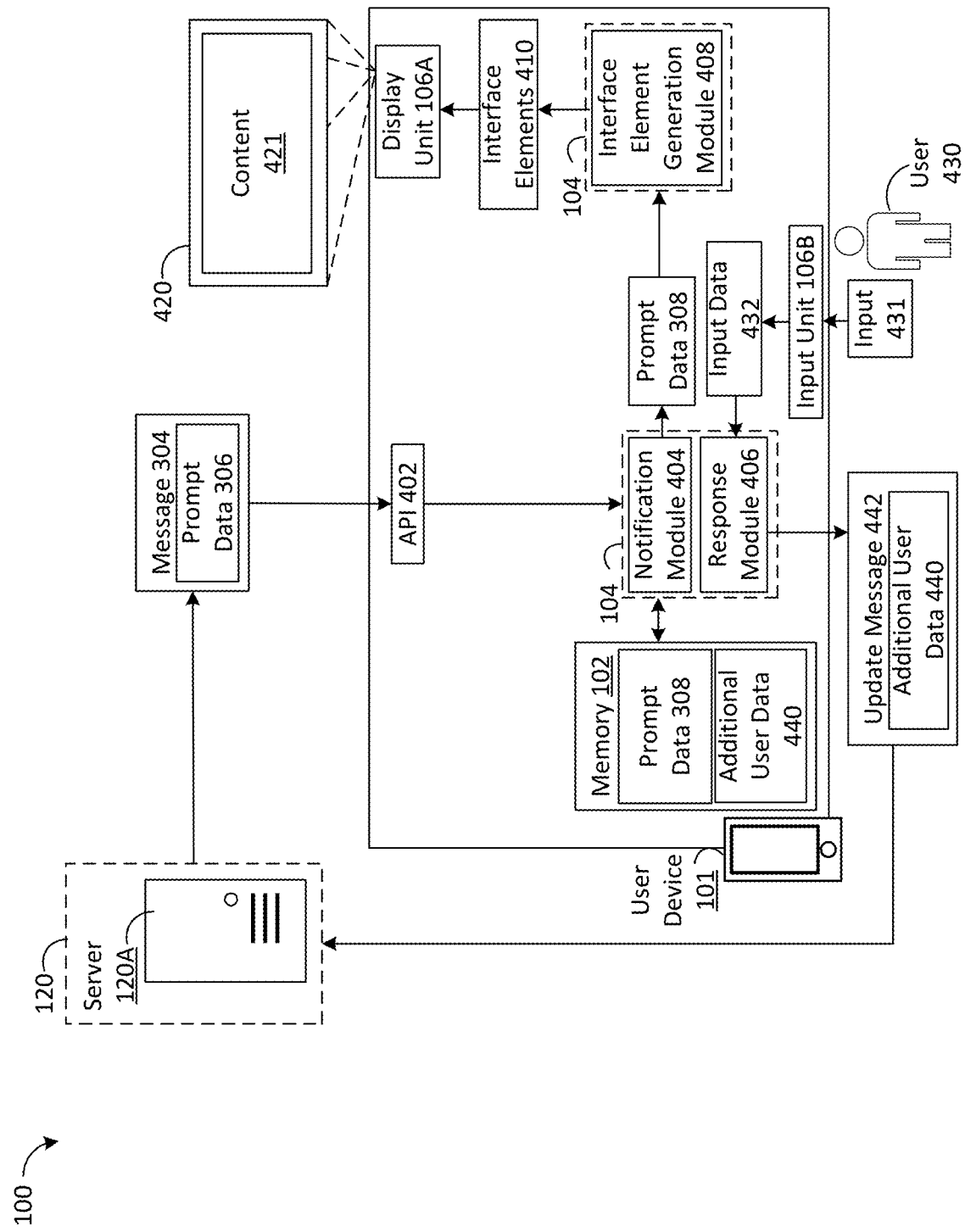

Referring to FIG. 4, a programmatic interface established and maintained by user device 101, such as API 402, may receive prompt message 304 that includes prompt data 306. As described herein, user device 101 may receive prompt message 304 via a channel of communications established programmatically between API 402 and executed notification engine 127D. One or more processors of user device 101, such as processor 105, may execute notification module 404 to obtain prompt message 304 from API 402. Additionally, executed notification module 404 may parse prompt message 304 and obtain prompt data 306, and in some instances, the layout data. Further, executed notification module 404 may store prompt data 306, and in some instances the layout data, within memory 102.

Additionally, executed notification module 404 may provide prompt data, and in some instances the associated layout data as an input to interface element generation module 408. Interface element generation module 408 may perform operations that generate and route interface elements 410, associated with the prompt data 306, and in some instances, the associated lay out data, to display unit 106A. In some instances, when rendered for presentation within a corresponding GUI, such as GUI 420, by display unit 106A, interface elements 410 may provide content 421. Content 421 may provide a graphical representation of prompt message 304 to the user of user device 101, such as user 430, within a single display screen or window, or across multiple display screens or windows, of the GUI (e.g., in accordance with the one or more elements of layout data, as described herein).

In some examples, content 421 may include a prompt for the user of user device 101 to provide the determined additional identifiable information. In some instances, the determined additional identifiable information/data may comprise an identification document/card associated with the user 430. Additionally, the graphical representation of prompt message 304 may request user 430 to take a photo of the identification document/card of user 430 via a camera communicatively coupled to user device 101 and GUI 420 of executed application 104. User 430 may utilize the camera (or any optical sensor) to capture or obtain an image of the identification document/card of user 430. Executed application 104 may generate additional user data 440 including the image of the identification document/card of user 430. As described herein, the image of the identification document/card of user 430 may be a second set of identifiable information or data associated with the requesting user, such as the user of user device 101 or user 430. In some instances, executed application 104 may store the additional user data 440 within memory 102.

Figure 13:
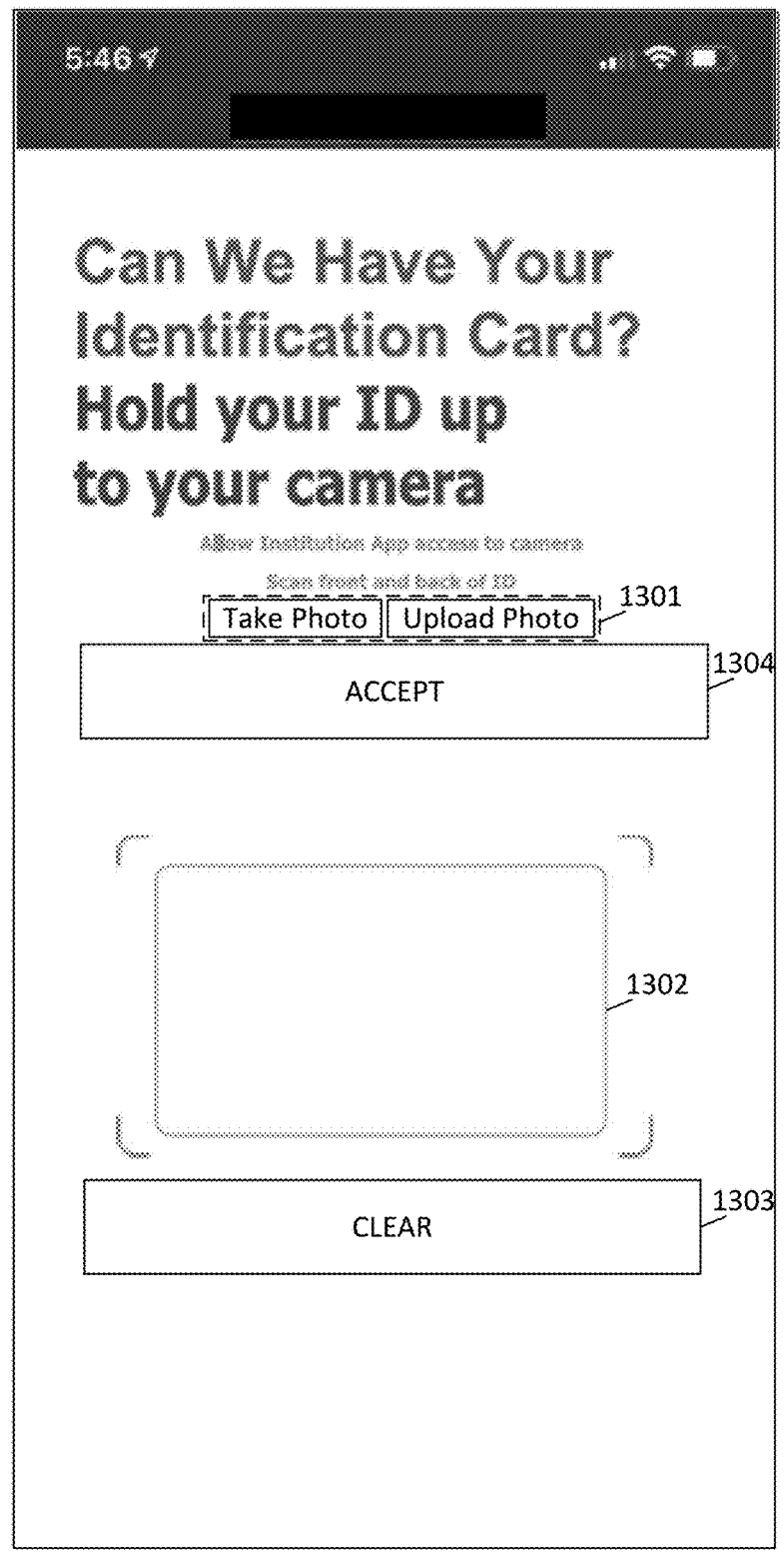
FIG. 13 is an example graphical user interface (GUI), in accordance with some exemplary embodiments.

By way of example, FIG. 13 illustrates an example GUI including an example content 421. As illustrated in FIG. 13, content 421 may include a prompt or text that requests the user of user device 101, such as user 430, to provide the determined additional identifiable information. As illustrated in FIG. 13, the determined additional identifiable information may be a captured image of an identification card of the user of user device 101. Additionally, content 421 may include a prompt or text that requests the user of user device 101 to take a photo of the identification card of user 430 via a camera communicatively coupled to user device 101. Moreover, content 421 may include interactive interface element 1301 to take a photo utilizing a camera communicatively coupled to user device 101 or upload a photo stored in memory 102, interface element 1302 that enables the user of user device 101 to preview the photo or image taken or uploaded by the user of user device 101, interactive interface element 1303 to clear the image previewed on interactive interface element 1301, and interactive interface element 1304 to accept and submit the image or photo previewed on interactive interface element 1301. In some instances, the GUI of executed application 104 may include an auto image/data capture feature with active guidance (e.g., with grids, etc.) for the user of user device 101 to support taking images of an identification card or any other document of the user (e.g., driver's license, passport, etc.) through the camera.

Figure 14:
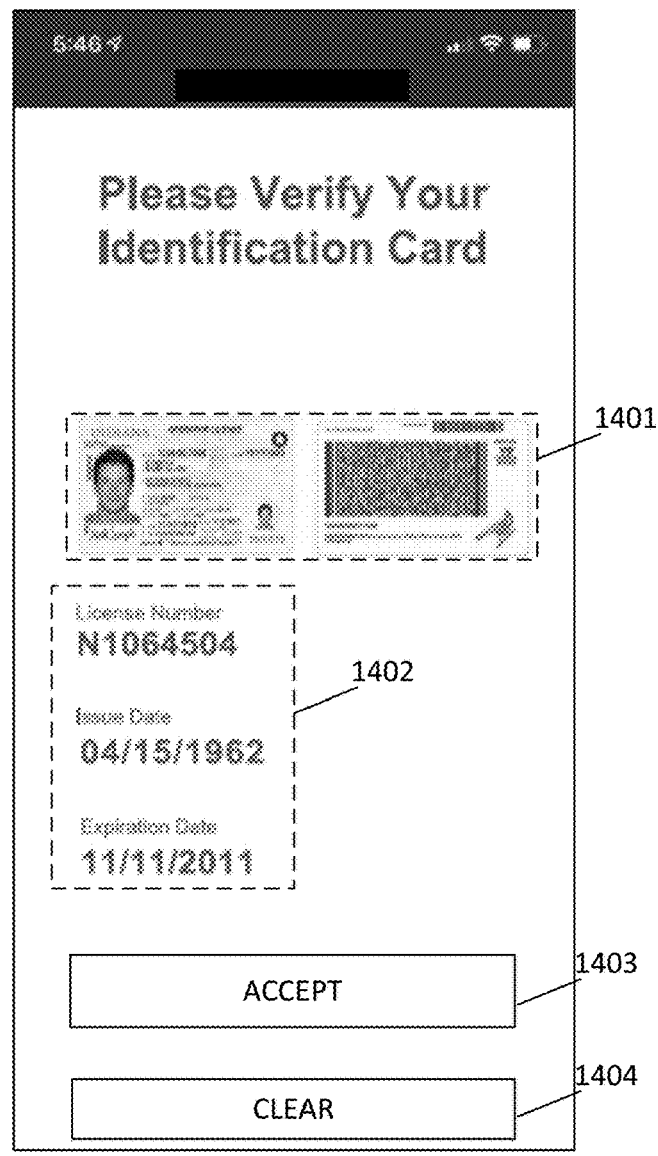
FIG. 14 is another example graphical user interface (GUI), in accordance with some exemplary embodiments.

In other instances, executed application 104 may perform optical character recognition techniques on the image of the identification card to obtain additional identifiable data associated with the user of user device 101. In such instances, the additional user data 440 may include the additional identifiable data obtained from the image. Further, the additional user data 440 may be presented to the user of user device 101 on a GUI of executed application 104. By way of example, FIG. 14 illustrates an example GUI including an example content 421 that includes the additional user data 440 obtained from an image or photo provided by the user of user device 101. As illustrated in FIG. 14, the photo or image may be of an identification card the user of user device 101 captured with a camera communicatively coupled to user device 101. Additionally, executed application 104 may apply optical character recognition techniques on the image of the identification card. Based on the application of the optical character recognition techniques, executed application 104 may identify one or more data points and attributes of the image. The one or more data points and attributes of the image may correspond to one or more attributes of the identification card. Examples of an attribute of the identification card the one or more data points and attributes may correspond to, include characters and text included on the image of the identification card (e.g., license number, issue data and/or expiration date), a size of font of the characters and text included on the image of the identification card, layout, size, and placement of user image. Based on the identified one or more data points and attributes, executed application 104 may generate additional user data 440 identifying and characterizing the corresponding attributes of the identification card. In some instances, the one or more data points and attributes may be associated with a bar code included in an image of the identification card (e.g., on the back of a driver's license). In such instances, the one or more data points and attributes may correspond to other data and information included in the bar code. Such other data and information of the bar code may be included in the additional user data 440 by executed application 104. Moreover, executed application 104 may cause display unit 106A to display the additional user data 440 on the GUI of executed application 104, such as on content 421 of GUI 420. Further, content 421 may include interface element 1401 displaying the image or photo that executed application 104 applied the optical character recognition techniques to interface element 1402 that displays data/information of additional user data 440, interactive interface element 1403 to accept and submit the displayed data/information of additional user data 440 of interface element 1402, and interactive interface element 1404 to clear/reject the displayed data/information of additional user data 440 of interface element 1402.

In other examples, the determined additional identifiable information/data may be identifiable information/data the user of user device 101, such as user 430, may provide on the GUI of executed application 104. For instance, the graphical representation of prompt message 304 may request user 430 to enter or input data/information on an interactive form included in content 421. User 430 may utilize input unit 106B to provide input 431 corresponding to the inputted data/information requested. Executed application 104 may generate additional user data 440 including the inputted data/information requested. As described herein, the inputted data/information requested may be included in the second set of identifiable information or data associated with the requesting user, such as the user of user device 101 or user 430.

Figure 15:
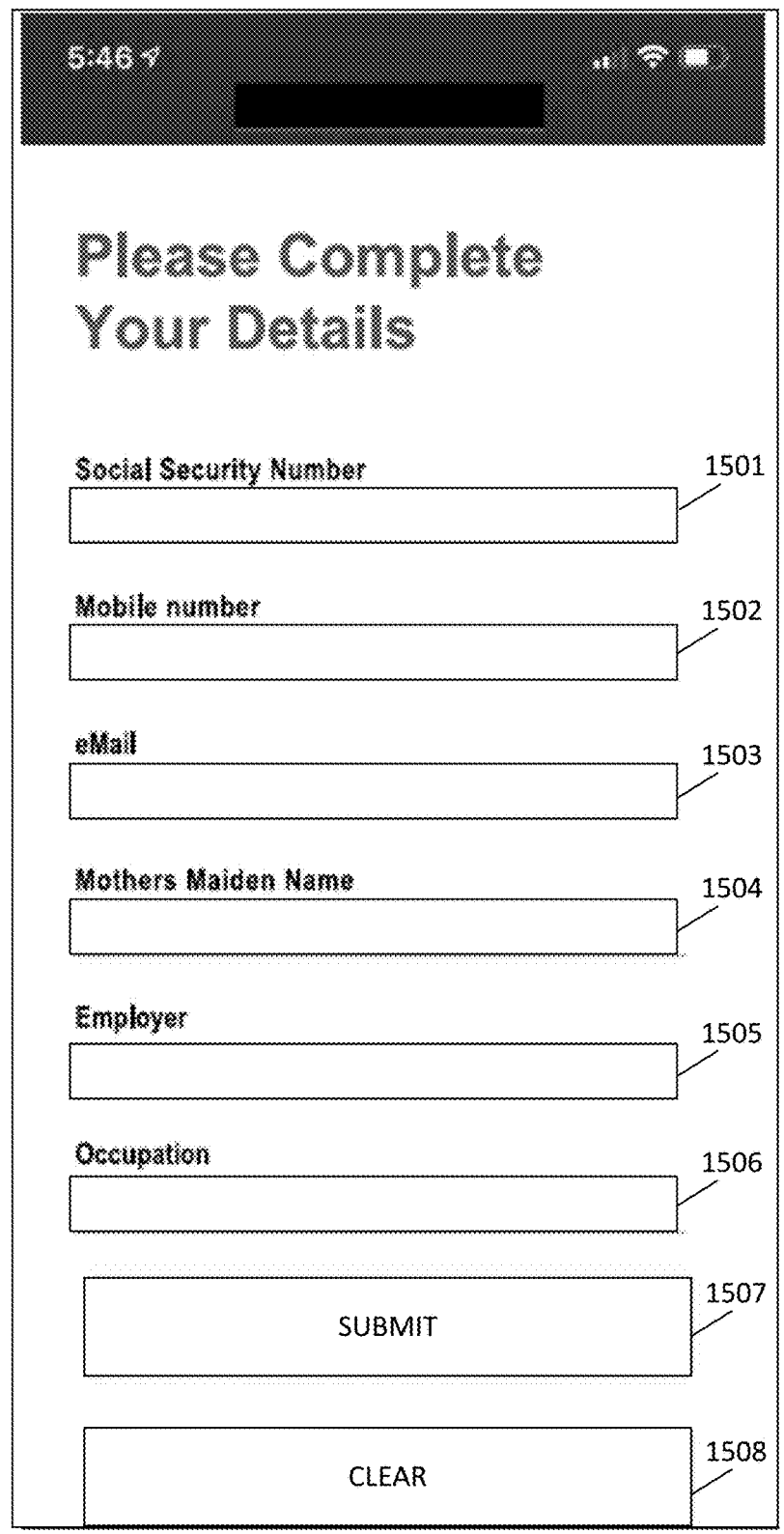
FIG. 15 is another example graphical user interface (GUI), in accordance with some exemplary embodiments.

By way of example, FIG. 15 illustrates an example GUI including an example content 421. As illustrated in FIG. 15, content 421 may include a prompt or text that requests the user of user device 101, such as user 430, to provide the determined additional identifiable information. As illustrated in FIG. 15, the determined additional identifiable information may be additional data/information associated with the user of user device 101, such as the social security number of the user, the mobile number of the user, an e-mail address of the user, the maiden name of the mother of the user, an employer of the user, and/or the occupation of the user. Additionally, content 421 may include interactive interface elements 1501-1506. Each of interactive interface elements 1501-1506 may comprise text boxes that the user of user device 101 may input data/information into, via input unit 106B. Additionally, content 421 may include interactive interface element 1507 to accept and submit the inputted data/information to institution computing system 120, and interactive interface element 1508 to clear information or data inputted into interactive interface elements 1501-1506. As described herein, the inputted data/information may be input 431. Additionally, executed response module 406 may generate additional user data 440 including the inputted data/information as described herein.

In various examples, content 421 may include a prompt for the user of user device 101 to transmit one or more images of the user. Institution computing system 120 may, in real time, authenticate the user based on the one or more images. In some instances, the graphical representation of prompt message 304 may request user 430 to take a photo of themselves (e.g., the face of user 430) via a camera communicatively coupled to user device 101 and GUI 420 of executed application 104. User 430 may utilize the camera (or any optical sensor) to capture or obtain an image of their face and executed application 104 may generate user data including the image of the face of user 430. Institution computing system 120 may perform operations utilizing facial matching or image recognition processes to determine whether the image of the face of user 430 is consistent with other images of user 430 stored and maintained by institution computing system 120. Additionally, institution computing system 120 may create or generate an account for user 430, based in part on institution computing system 120 determining the image of the face of user 430 is consistent with other images of user 430 stored and maintained by institution computing system 120.

Additionally, or alternatively, in other instances, institution computing system 120 may perform a "liveness" check. In such instances, user of user device 101 may transmit a live video or multiple images, sequentially and in real time, to institution computing system 120 may analyze the images of the user of user device 101 being transmitted from user device 101 to determine whether each subsequent image indicates pixel deviations from the previously received image. Additionally, institution computing system 120 may detect the existence of movements of the user of user device 101 based on the determined pixel deviations. Moreover, in instances where institution computing system 120 detects movement of the user of user device 101, institution computing system 120 may determine the images being received from user device 101 is "live" or occurring real time. Additionally, institution computing system 120 may create or generate an account for user 430, based in part on institution computing system 120 determining the images are being received from user device 101 is "live" or occurring real time.

In various instances not illustrated in FIG. 4, one or more other computing systems, such as an artificial intelligence (AI)/machine learning (ML) based cloud computing system may perform the operations utilizing facial matching or image recognition processes and/or the "liveness" check on one or more images captured by a camera communicatively coupled to user device 101. In such instances, the user device may transmit the one or more images of the user of user device 101, such as user 430, to the other computing system(s) via institution computing system 120. Additionally, the other computing system(s) (as well as user device 101 and/or institution computing system 120) may utilize AI/ML based processes to implement the facial matching or image recognition processes and/or the "liveness" check. In some examples, the one or more other systems may implement an iterative process to adaptively improve, update or retrain the AI/ML based facial matching or image recognition processes and/or the "liveness" check. In such examples, the AI/ML based facial matching or image recognition process and/or the "liveness" check may be adaptively improved, updated or retrained based on the one or more images and corresponding determinations stemming from the facial matching or image recognition processes and/or the "liveness" check.

Referring back to FIG. 4, executed notification module 404 may transmit additional user data 440 to institution computing system 120. In some examples, executed notification module 404 may transmit additional user data 440 to institution computing system 120 in response to user input. By way of example, as illustrated in FIG. 4, user 430 may provide input 431 into input unit 106B indicating transmission of additional user data 440 (e.g., the image of an identification card of user 430) to institution computing system 120. Input unit 106B may generate input data 432 based on input 431. One or more processors of user device 101, such as processor 105, may execute response module 406 to obtain input data 432. Executed response module 406 may trigger or signal executed notification module 404 to transmit additional user data 440 to institution computing system 120 based on and responsive to input data 432. As illustrated in FIG. 4, executed notification module 404 may obtain additional user data 440 in response to being triggered or signaled by executed response module 406. Additionally, executed notification module 404 may generate an update message 442 package one or more portions of additional user data 440 within portions of update message 442. Moreover, executed notification module 404 may transmit update message 442 including additional user data 440 to institution computing system 120.

Figure 5:
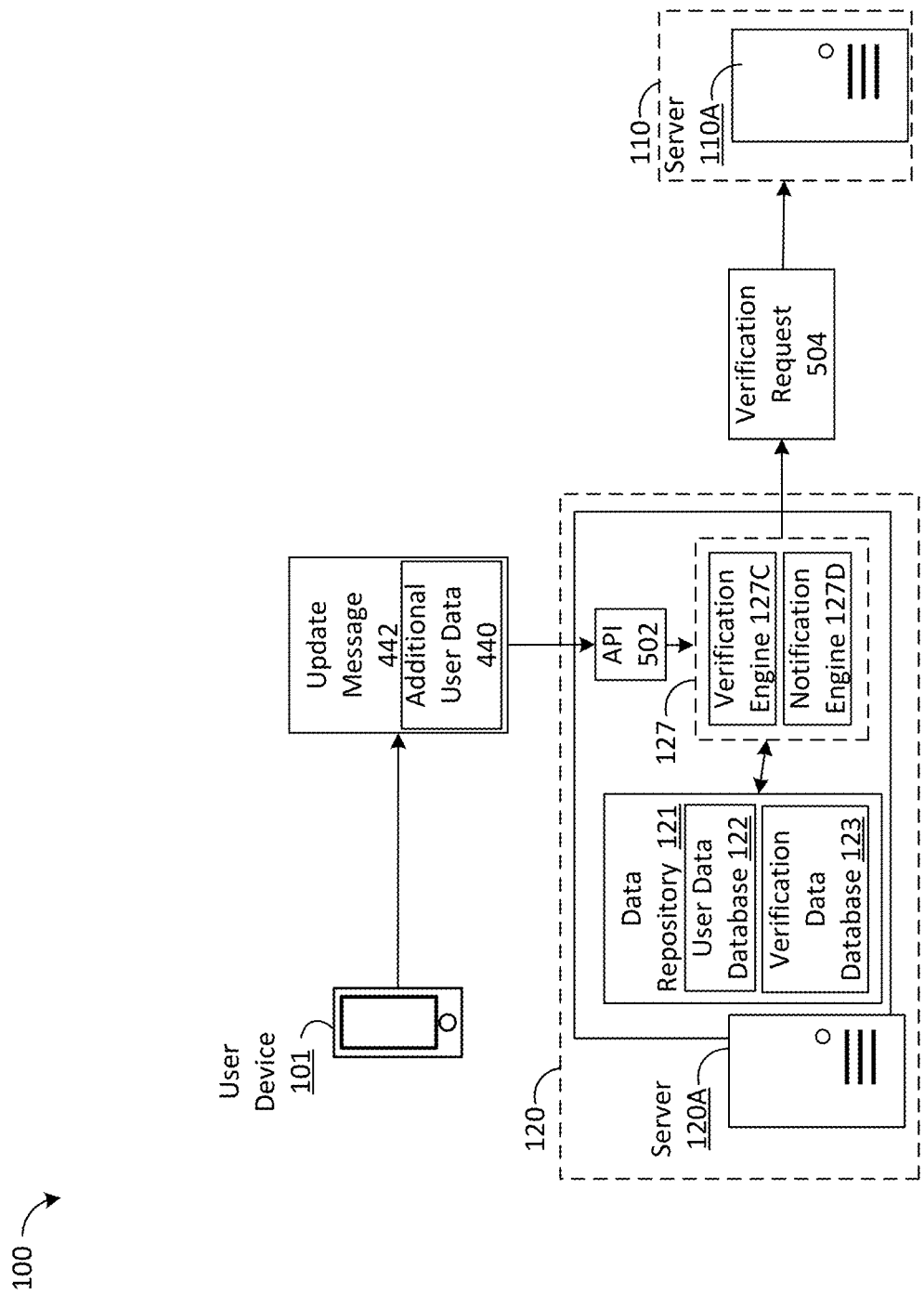

Referring to FIG. 5, a programmatic interface established and maintained by institution computing system 120, such as API 502, may receive update message 442 that includes additional user data 440. As described herein, institution computing system 120 may receive update message 442 via a channel of communications established programmatically between API 502 and executed notification module 404. Additionally, API 502 may route update message 442 to executed verification engine 127B. Executed verification engine 127B may parse update message 442 and obtain additional user data 440. In some instances, executed verification engine 127B may store additional user data 440, within corresponding portions of data repository 121, such as user data database 122. In other instances, additional user data 440 may include an image but may not include additional identifiable data extracted from the image. As described herein, the additional identifiable data may be associated with the user of user device 101 (e.g., name of the user of user device 101 extracted from an image of a driver's license of the user of user device 101). In such instances, executed verification engine 127B may perform optical character recognition techniques, similarly described with executed application 104, on the image to obtain additional identifiable data associated with the user of user device 101. In such instances, executed verification engine 127B may store the additional identifiable data of the user of user device 101 in corresponding portions of data repository 121, such as user data database 122.

As described herein, executed verification engine 127B may perform operations to verify identifiable information or data (e.g., the first set and/or second set of identifiable data or information) stored in user data database 122 of a particular user, such as a user of user device 101. In some examples, executed verification engine 127B may itself verify the identifiable information or data of the user, such as user of user device 101. In other examples, executed verification engine 127B may request another computing system, such as third-party computing system 110, to verify the identifiable information or data of the user.

In examples where executed verification engine 127B itself verifies the identifiable information or data of the user, executed verification engine 127B may obtain data, such as verification data, from another computing system, such as third-party computing system 110 (e.g., the DMV, fraud detection agencies, underwriting entities, and/or a credit Bureau). Additionally, executed verification engine 127B may utilize the obtained data to verify the identifiable information of the user obtained from user device 101 (e.g., captured images of a driver license of the user) is correct or accurate. For example, executed verification engine 127B may trigger or signal executed notification engine 127D. Executed notification engine 127D may generate verification request 504 for information of the user of user device 101. As described herein, executed notification engine 127D may package within verification request 504 data identifying the user of user device 101 (e.g., a corresponding name) and/or information or data identifying identifiable data executed verification engine 127B is verifying. Additionally, executed notification engine 127D may transmit verification request 504 to third-party computing system 110.

Figure 6A:
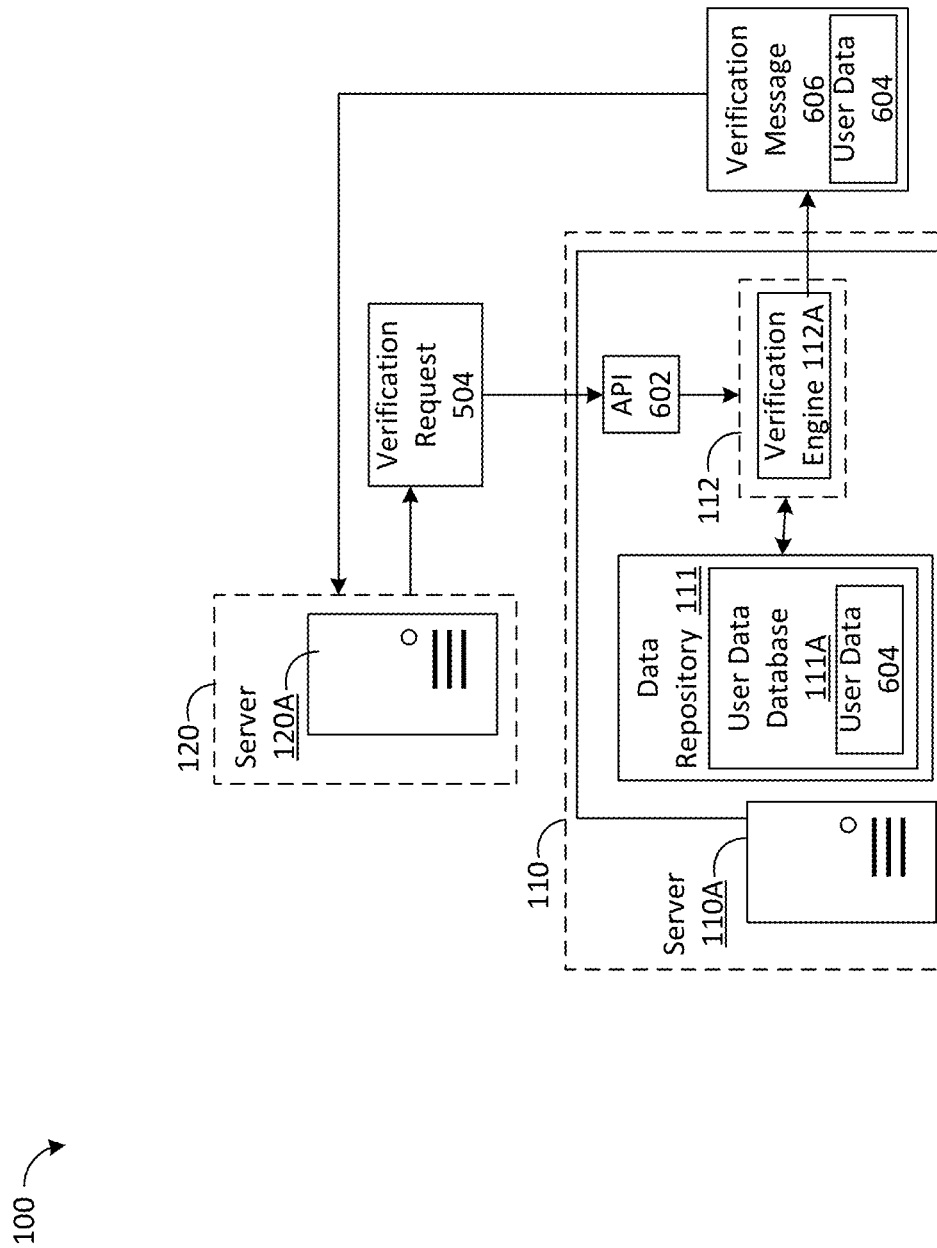

Referring to FIG. 6A, a programmatic interface established and maintained by third-party computing system 110 such as API 602, may receive verification request 504. As described herein, third-party computing system 110 may receive verification request 504 via a channel of communications established programmatically between API 602 and executed notification engine 127D. Additionally, API 602 may route verification request 504 to verification engine 112A. The one or more processors of server 110A of third-party computing system 110 may execute verification engine 112A to obtain from data repository 111, user data 604 corresponding to verification request 504. For instance, verification request 504 may include data identifying the user of user device 101. Additionally, executed verification engine 112A may parse verification request 504 to obtain the data identifying the user of user device 101. Based on the data identifying the user of user device 101, executed verification engine 112A may obtain, from user data database 111A, one or more portions of user data 604. The one or more portions of user data 604 may include identifiable data or information of the user of user device 101 that executed verification engine 127B may utilize to verify the identifiable data or information of the user of user device 101 that was obtained from user device 101.

For instance, the one or more portions of user data 604 may include the name of the user of user device 101, a street address of the user of user device 101 and/or a social security number of the user of user device 101. Additionally, a portion of the identifiable data or information obtained from user device 101 may include an image of the driver's license. In another instance, verification request 504 may include information or data identifying identifiable data executed verification engine 127B is verifying. Additionally, executed verification engine 112A may parse verification request 504 to obtain the information or data identifying identifiable data executed verification engine 127B is verifying. Based on the obtained information/data, executed verification engine 112A may obtain, from user data database 111A, one or more portions of user data 604 corresponding to the obtained information/data. The one or more portions of user data 604 may include identifiable data or information of the user of user device 101 that executed verification engine 127B may utilize to verify the identifiable data or information of the user of user device 101 that was obtained from user device 101. For instance, the one or more portions of user data 604 may include an image of an identification card associated with the user of user device 101. Additionally, a portion of the identifiable data or information obtained from user device 101 may include an image of an identification card. Moreover, executed verification engine 112A may generate verification message 606 and package the one or more portions of user data 604 into portions of verification message 606. Further executed verification engine 112A may transmit verification message 606 to institution computing system 120.

Referring back to FIG. 5, in examples where one or more other computing systems, such as third-party computing system 110, verifies the identifiable information or data of the user of user device 101, executed verification engine 127B may transmit one or more portions of identifiable information or data of a user to the other computing system (s). Additionally, the other computing system(s) may utilize data stored or maintained in the other computing system(s) to verify the one or more portions of identifiable information or data of the user is correct/accurate. For example, executed verification engine 127B may obtain one or more portions of identifiable information or data of the user of user device 101 to be verified, from user data database 122. Additionally, executed verification engine 127B may provide the one or more portions of identifiable information or data of the user of user device 101 to executed notification engine 127D. Executed notification engine 127D may generate a verification request 504 and package the one or more portions of identifiable information or data of the user of user device 101 into portions of verification request 504. Additionally, executed notification engine 127D may transmit verification request 504 to third-party computing system 110.

Figure 6B:
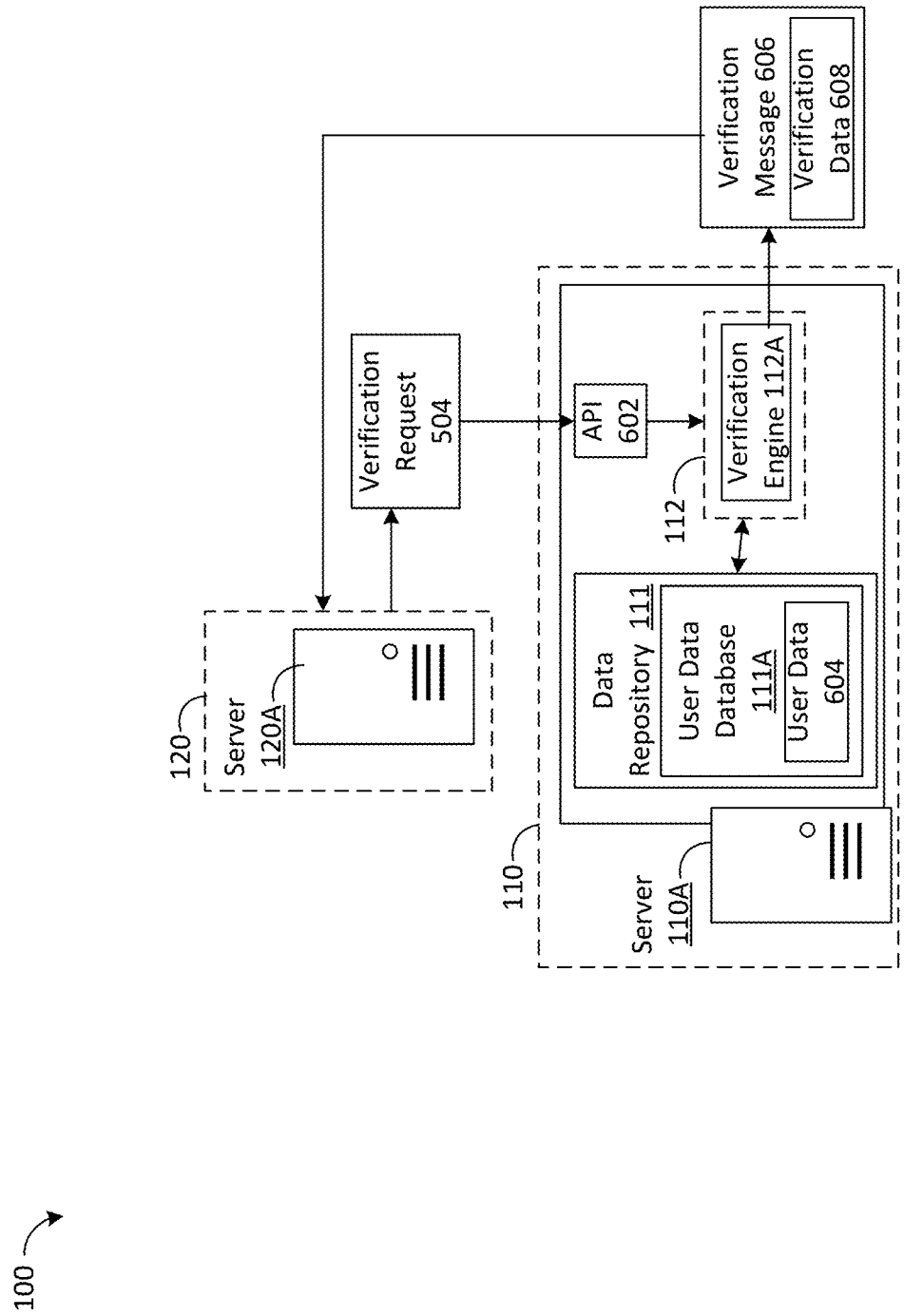

Referring to FIG. 6B, a programmatic interface established and maintained by third-party computing system 110 such as API 602 may receive verification request 504. As described herein, third-party computing system 110 may receive verification request 504 via a channel of communications established programmatically between API 602 and executed notification engine 127D. Additionally, API 602 may route verification request 504 to verification engine 112A. The one or more processors of server 110A of third-party computing system 110 may execute verification engine 112A to parse verification request 504 to obtain one or more portions of identifiable information or data of the user of user device 101. Additionally, executed verification engine 112A may obtain, from data repository 111, portions of user data 604 corresponding to the obtained one or more portions of identifiable information or data of the user of user device 101. Moreover, executed verification engine 112A may verify the obtained one or more portions of identifiable information or data of the user of user device 101 by determining whether the portions of user data 604 match the obtained one or more portions of identifiable information or data of the user of user device 101.

For instance, the portions of user data 604 may include an image of an identification card associated with the user of user device 101. Additionally, the one or more portions of the identifiable data or information obtained from user device 101 may include an image of an identification card. Executed verification engine 112A may compare the image of the identification card of user data 604 to the image of the identification card of the one or more portions of identifiable data or information obtained from user device 101. Additionally, executed verification engine 112A may determine whether the image of the identification card of user data 604 and the image of the identification card of the one or more portions of identifiable data or information obtained from user device 101 match. Moreover, executed verification engine 112A may generate verification data 608 indicating whether the image of the identification card of user data 604 and the image of the identification card of the one or more portions of identifiable data or information obtained from user device 101 match. Further, executed verification engine 112A may generate verification message 606 and package the one or more portions of verification data 608 into portions of verification message 606. Executed verification engine 112A may transmit verification message 606 to institution computing system 120.

Figure 7:
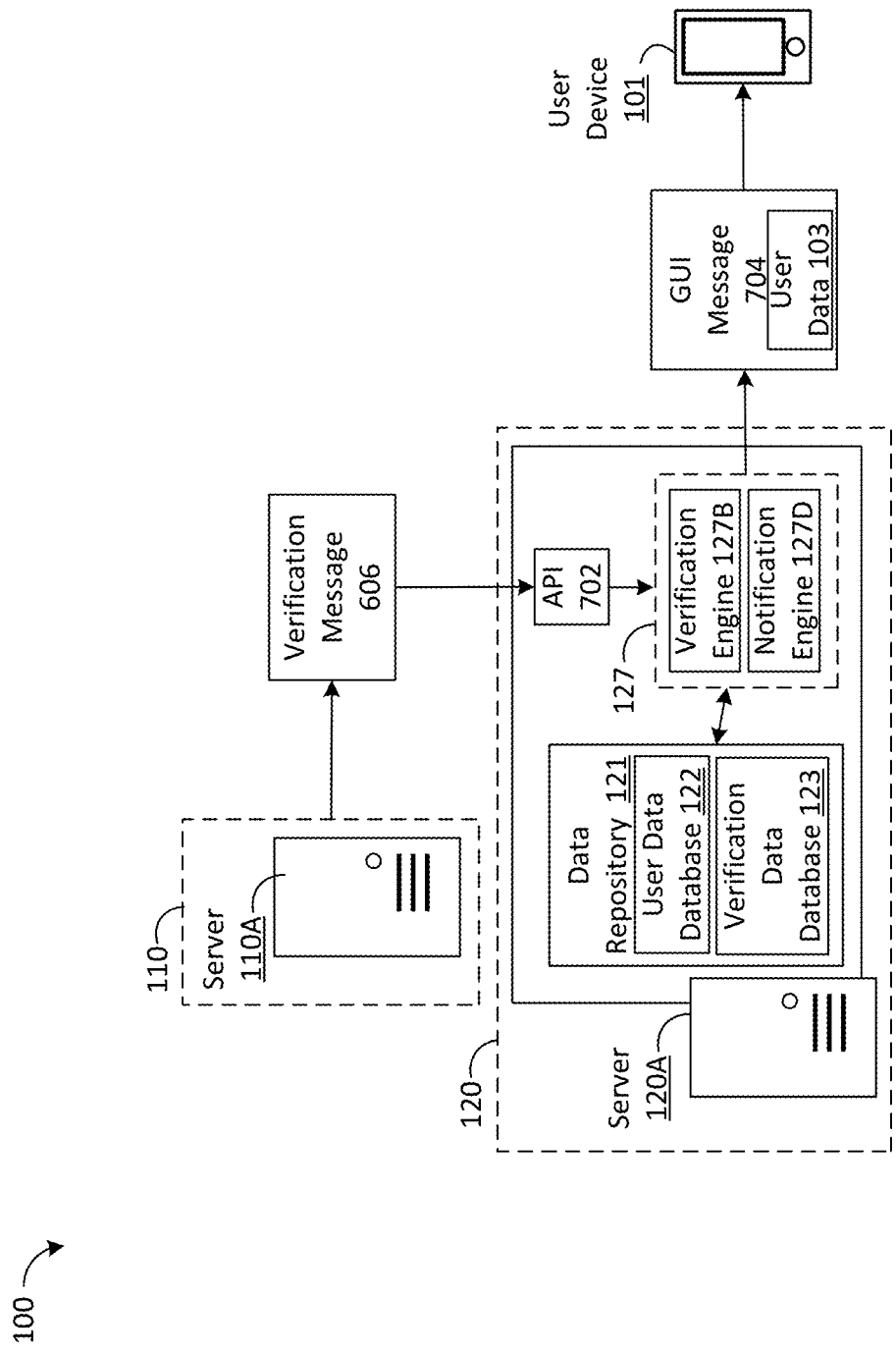

Referring to FIG. 7, a programmatic interface established and maintained by third-party computing system 110 such as API 702, may receive verification message 606. As described herein, institution computing system 120 may receive verification message 606 via a channel of communications established programmatically between API 702 and executed verification engine 112A. Additionally, API 702 may route verification message 606 to executed verification engine 127B. Executed verification engine 127B may determine whether the identifiable data or information of user of user device 101 and obtained from user device 101 is correct/accurate based on the data included in verification message 606.

In examples where verification message 606 includes one or more portions of user data 604 associated with the user of user device 101, executed verification engine 127B may determine whether the portions of user data 604 match the obtained one or more portions of identifiable information or data of the user of user device 101. For example, executed verification engine 127B may parse verification message 606 and obtain the portions of user data 604 associated with the obtained one or more portions of identifiable information or data of the user of user device 101. In such an example, the portions of user data 604 may include an image of a driver's license associated with the user of user device 101 (or any image of the user included in user data 604, such as a passport image, or any other image of an identification document associated with the user). Additionally, executed verification engine 127B may obtain, from user data database 121, the one or more portions of the identifiable data or information obtained from user device 101 may include an image of a driver's license. Executed verification engine 127B may compare the image of the driver's license included in user data 604 (or any image of the user included in user data 604) to the image of the driver's license of the one or more portions of identifiable data or information obtained from user device 101.

For instance, executed verification engine 127B may apply optical character recognition techniques on portions of user data 604 corresponding to an image of the driver's license and/or portions of identifiable data or information obtained from user device 101 corresponding to an image of the driver's license. Based on the application of the optical character recognition techniques on portions of user data 604 corresponding to an image of the driver's license and/or portions of identifiable data or information obtained from user device 101 corresponding to an image of the driver's license, executed verification engine 127B may identify one or more data points and attributes of the corresponding image. Additionally, for the portions of user data 604 corresponding to the image of the driver's license and based on the corresponding identified one or more data points and attributes, executed verification engine 127B may generate image feature data identifying and characterizing the corresponding attributes of the corresponding driver's license. Moreover, for the portions of identifiable data or information obtained from user device 101 corresponding to the image of the driver's license and based on the corresponding identified one or more data points and attributes, executed verification engine 127B may generate image feature data identifying and characterizing the corresponding attributes of the corresponding driver's license. Further, executed verification engine 127B may compare the attribute feature data associated with user data 103 to attribute feature data associated with the identifiable data or information obtained from user device 101 (e.g., compare the corresponding attributes of the image of identification card of the identifiable data or information obtained from user device 101 to the corresponding attributes of the image of an identification card of user data 103).

Based on the comparison, executed verification engine 127B may determine whether the image of the driver's license of user data 604 to the image of the driver's license of the one or more portions of identifiable data or information obtained from user device 101 match. Additionally, executed verification engine 127B may generate verification data indicating whether the image of the driver's license of user data 604 to the image of the driver's license of the one or more portions of identifiable data or information obtained from user device 101 match. Further, based on the verification data indicating whether the image of the driver's license of user data 604 to the image of the driver's license of the one or more portions of identifiable data or information obtained from user device 101 match, executed verification engine 127B may determine whether the one or more portions of the identifiable data or information of the user of user device 101 is correct. For instance, the verification data may indicate the image of the driver's license of user data 604 to the image of the driver's license of the one or more portions of identifiable data or information obtained from user device 101 match. Executed verification engine 127B may determine the one or more portions of identifiable data or information obtained from user device 101 is correct or accurate. In some instances, executed verification engine 127B may generate outcome data indicating that the one or more portions of identifiable data or information obtained from user device 101 is correct or accurate.

Alternatively, the verification data may indicate that the image of the driver's license of user data 604 and the image of the driver's license of the one or more portions of identifiable data or information obtained from user device 101 do not match. Executed verification engine 127B may determine the one or more portions of identifiable data or information obtained from user device 101 is incorrect or unverifiable. In some instances, executed verification engine 127B may generate outcome data indicating that the one or more portions of identifiable data or information obtained from user device 101 is incorrect or unverifiable. In other instances, executed verification engine 127B may store the one or more portions of user data 604 and outcome data within corresponding portions of data repository 121, such a s verification data database 125.

In examples where verification message 606 includes one or more portions of verification data 608, executed verification engine 127B may determine whether the one or more portions of identifiable data or information obtained from user device 101 is correct or accurate. For example, executed verification engine 127B may parse verification message 606 to obtain one or more portions of verification data 608. In instances where the one or more portions of verification data 608 indicate portions of user data 604 match one or more portions of identifiable data or information obtained from user device 101, executed verification engine 127B may determine the one or more portions of identifiable data or information obtained from user device 101 is correct or accurate. Otherwise, in instances, where the one or more portions of verification data 608 indicate portions of user data 604 do not match one or more portions of identifiable data or information obtained from user device 101, executed verification engine 127B may determine the one or more portions of identifiable data or information obtained from user device 101 is incorrect or unverifiable. Additionally, executed verification engine 127B may generate outcome data indicating whether the one or more portions of identifiable data or information obtained from user device 101 is correct or accurate. In some instances, executed verification engine 127B may store the one or more portions of user data 604 and outcome data within corresponding portions of data repository 121, such a s verification data database 122.

Further, based on the outcome data, executed verification engine 127B may perform operations that either request additional information or documentation from the user of user device 101, or request confirmation of whether the information/data provided so far, is accurate and correct. In examples where the outcome data indicates the one or more portions of identifiable data or information obtained from user device 101 is correct or accurate, executed verification engine 127B may obtain, from user data database 121, portions of user data 103 corresponding to identifiable data or information of the user of user device 101 the user of user device 101 has provided so far to institution computing system 120 (e.g., the first set of identifiable data or information and/or the second set of identifiable data or information). Additionally, executed verification engine 127B may transmit to executed notification engine 127D the obtained portions of user data 103. Moreover, executed notification engine 127D may generate GUI message 704 and package within portions of GUI message 704 the obtained portions of user data 103. Further, executed notification engine 127D may transmit GUI message 704 to user device 101.

Otherwise, in examples where the outcome data indicates the one or more portions of identifiable data or information obtained from user device 101 is incorrect or unverifiable, executed verification engine 127B may request additional information or documentation. In some examples, and not illustrated in FIG. 7, executed verification engine 127B may trigger or signal executed notification engine to generate and transmit a second prompt message to user device 101. In such examples, upon receiving the second prompt message, user device 101 may generate a prompt, such as a pop-up alert, a notification, a dynamic modification of a specific region of executed application 104. As described herein, the prompt may request the user of user device to provide additional information or documentation. In some instances, additional information or documentation may be identifiable data of the user of user device 101. In other instances, the prompts may also enable the user of user device 101 to complete the process of creating or generating the account for the user over any number of time periods (i.e., at the user's own pace). For instance, the prompt may be related to a task (e.g., a request to submit a driver's license) and the user may respond to the prompt at a later point in time (e.g., hours, minutes, or days later) that is convenient to the user, without the user losing any progress made as it relates to onboarding. Optionally, if a predetermined amount of time has elapsed without receiving a user response, institution computing system 120 may securely save and store the progress made up to that point, such that once the user response is received, the institution server system may retrieve progress and continue with the onboarding process. Any additional data or information user of user device 101 provides to institution computing system 120 may be verified utilizing the processes and techniques as described herein.

In various instances, executed verification engine 127B may determine the additional information or documentation to be requested from user of user device 101 based on the first set of identifiable data or information and/or the second set of identifiable data or information. Additionally, executed verification engine 127B may make such determinations in response to determining the one or more portions of identifiable data or information obtained from user device 101 is incorrect or unverifiable. Moreover, such determinations may be further based on a predetermined list of requirements associated with the requested task, such as, opening, creating, or generating a new account for the requesting user. Further, executed verification engine 127B may generate additional prompt data indicating the determined additional information or documentation to be requested from the user of user device 101. Executed verification engine 127B may provide the additional prompt data to executed notification engine 127D and executed notification engine 127D may package the additional prompt data into the second prompt message.

Figure 8:
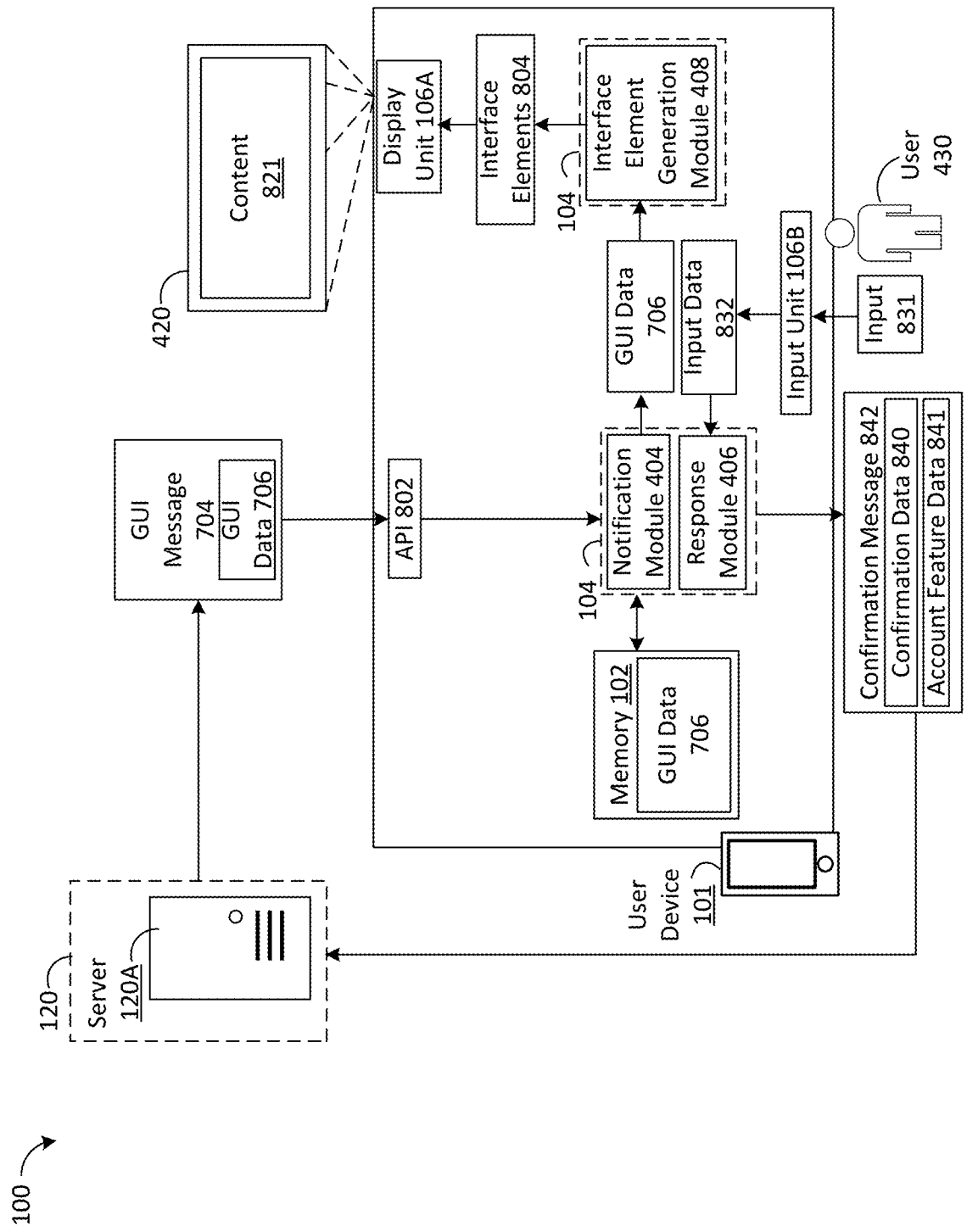

Referring to FIG. 8, a programmatic interface established and maintained by user device 101, such as API 802, may receive GUI message 704 including portions of user data 103 of a user operating user device 101. As described herein, user device 101 may receive GUI message 704 via a channel of communications established programmatically between API 802 and executed notification engine 127D. Additionally, API 802 may route GUI message 704 to executed notification module 404. As described herein, executed notification module 404 may update a GUI of executed application 104 displayed on a display, such as display unit 106A of user device 101.

In some examples, user device 101 may utilize GUI message 704 to update the GUI of executed application 104 displayed on the display of user device 101 by auto populating fields displayed on the GUI of executed application 104 with the portions of user data 103 included in GUI message 704, such as the first set of identifiable data and/or the second set of the identifiable data. For example, executed notification module 404 may obtain GUI message 704. Additionally, executed notification module 404 may parse GUI message 704 and obtain the portions of user data 103 of the user of user device 101. In some instances, executed notification engine 404 may store the portions of user data 103 obtained from GUI message 704 within memory 102. Moreover, executed notification engine 404 may provide the portions of user data 103 of GUI message 704 to interface element generation module 408. Executed interface element generation module 408 may perform operations that generate and route interface elements 804 to display unit 106A. In various instances, when rendered for presentation within a corresponding GUI of executed application 104, such as GUI 420, by display unit 106A, interface elements 350 may provide content 821. As described herein, content 821 may include a graphical representation of GUI message 704 to the user of user device 101, such as user 430, within a single display screen or window, or across multiple display screens or windows, of the GUI (e.g., in accordance with the one or more elements of layout data, as described herein).

In some instances, content 821 may include one or more fields of an interactive form that the user of user device 101, such as user 430, may interact with on display unit 106A. Additionally, the executed application 104 may auto-fill or auto-populate one or more fields of the interactive form displayed on display unit 106A with data or information included in the portions of user data 103 of GUI message 704. Moreover, the graphical representations of GUI message 704 may include an interactive element/feature, such as a button that enables the user of user device 101 to confirm whether the information of the interactive form is correct. For instance, the user of user device 101, such as user 430, may provide an input 831 to input unit 106B. Input 831 may indicate whether the information or data automatically filled or populated in the one or more fields of the interactive form is accurate/correct. Additionally, input unit 106B may generate input data 321 based on input 831 and indicating whether the information or data automatically filled or populated in the one or more fields of the interactive from is accurate/correct. Moreover, input unit 106B may route input data 832 to executed response module 406 and executed response module 406 may generate confirmation data 840 indicating whether the information or data automatically filled or populated in the one or more fields of the interactive from is accurate/correct. Executed response module 406 may also generate confirmation message 842 and package within portions of conformation message 842 one or more portions of confirmation data 840. Further, executed response module 406 may transmit confirmation message 842 to institution computing system 120. Based on the confirmation message 842, institution computing system 120 may generate/create the requested account for the user of user device 101.

In other instances, GUI message 704 may cause user device 101 to prompt or request a user to provide security information or credentials for the requested account to be generated/created. Additionally, or alternatively, GUI message 704 may cause user device 101 to prompt or request a user to provide one or more account related features. As described herein, examples of the one or more account related features may include user preferences associated with the account and/or one or more products or instruments issued by the institution. In such instances, GUI data 706 of GUI message 704 may further include additional GUI data 706 that executed notification module 404 may provide as input to executed interface element generation module 408. Executed interface element generation module 408 may perform operations that generate and route additional interface elements 804 to display unit 106A. Additionally, when rendered for presentation within a corresponding GUI of executed application 104, such as GUI 420, by display unit 106A, and in response to the user of user device 101 interacting with the interactive element/feature, such as a button, that enables the user of user device 101 to confirm whether the information of the interactive form is correct, the additional interface elements 804 may prompt the user of user device 101 to provide security information or credentials for the requested account to be generated/created, and in some instances, one or more account related features.

Additionally, user of user device 101, such as user 430, may provide additional input 831 to input unit 106B. The additional input may identify and characterize the security information or credentials for the requested account go be generated/created (e.g., a username and password), and in some instances, one or more account related features (e.g., user preferences account and/or one or more services or products to associate with the account). Moreover, based on the additional input 831, input unit 106B may generate additional input data 832 identifying and characterizing the security information or credentials for the requested account to be generated/created, and in some instance, one or more account related features. Further, input unit 106B may route additional input data 832 to executed response module 406. Executed response module 406 may generate account feature data 841 identifying and characterizing the security information or credentials for the requested account to be generated/created, and in some instance, one or more account related features. In various instances, and as illustrated in FIG. 8, executed response module 406 may further include the one or more portions of account feature data 841 in confirmation message 842.

Figure 16:
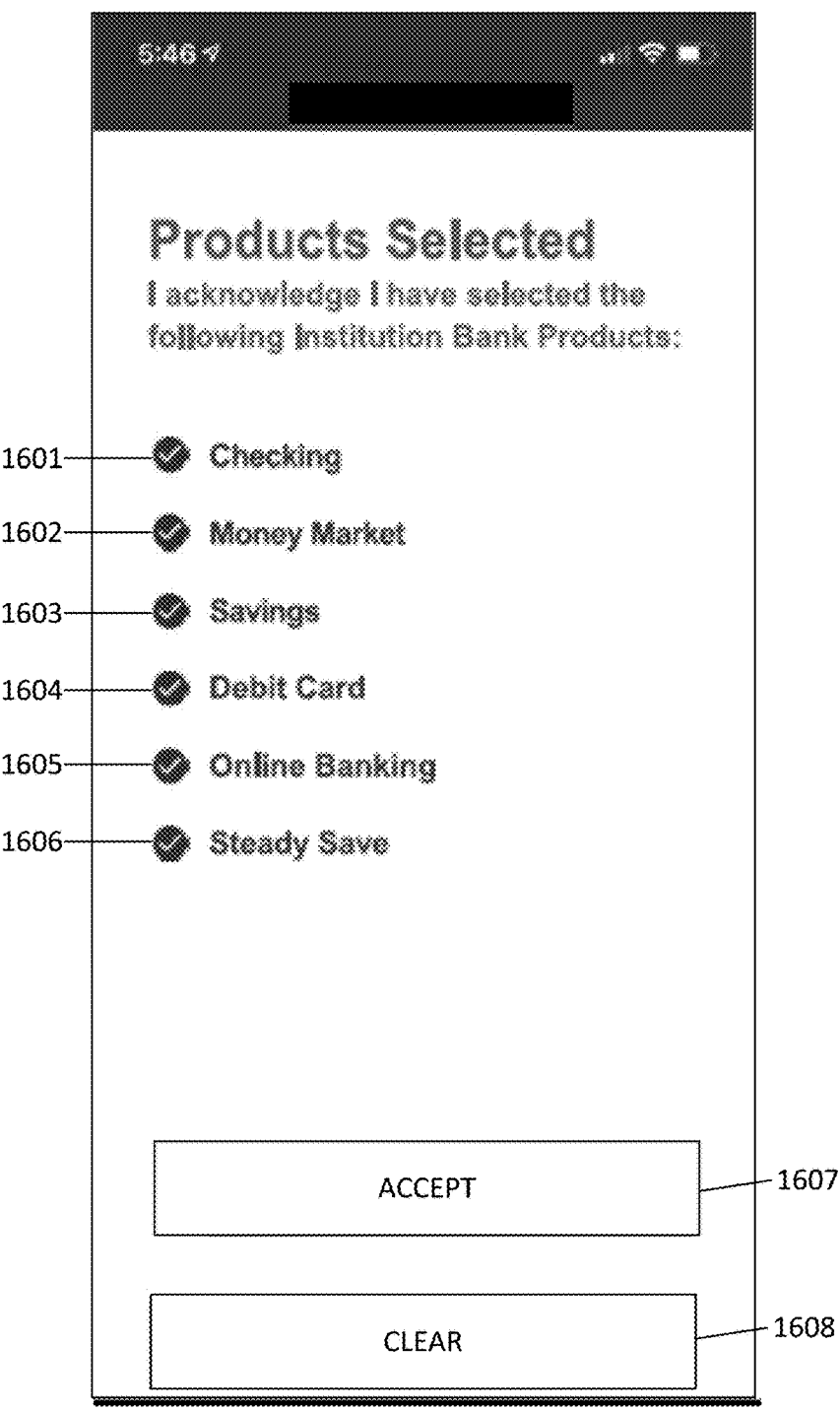
FIG. 16 is another example graphical user interface (GUI), in accordance with some exemplary embodiments.

By way of example, FIG. 16 illustrates example content 821 that includes interface elements 804 graphically representing the request for one or more account related features (e.g., user preferences account and/or one or more services and/or products to associate with the account). As illustrated in FIG. 16, content 821 may display one or more services and/or products to associate with the requested account. For instance, as illustrated in FIG. 16, the one or more products and/or services may include (among others) a "checking account," a "money market account," a "savings account," "debit card," "online banking," and a "steady save account." Additionally, each of the displayed or listed products and/or services may have an associated interactive feature, such as interactive feature 1601 corresponding to the "checking account", interactive feature 1602 corresponding to the "money market account", interactive feature 1603 corresponding to the "savings account", interactive feature 1604 corresponding to the "debit card", interactive feature 1605 corresponding to the "online banking," and interactive feature 1606 corresponding to the "steady save account," that each enables the user of user device 101 to select. Moreover, each selected product and/or service may be included in account feature data 841. For instance, content 821 may include interactive interface element 1607 that enables the user of user device 101 to accept the selected one or more services and/or products. Additionally, executed response module 406 may generate account feature data 841 identifying and characterizing the one or more services and/or products the user of user device 101 selected on content 821 of GUI 420, via input unit 106B. Alternatively, content 821 may include interactive interface element 1608 to clear the currently selected one or more products and/or services.

In other examples, and not illustrated in FIG. 8, in response to institution computing system 120 receiving confirmation message 842, institution computing system 120 may request or prompt the user of user device 101 to provide security information or credentials, and in some instances, one or more account related features. In such examples, upon institution computing system 120 receiving confirmation message 842, executed notification engine 127D may generate an additional GUI message that includes additional GUI data. Additionally, executed notification engine 127D may transmit the additional GUI message to user device 101. Executed notification module 404 may parse additional GUI message to obtain the additional GUI data and provide the additional GUI data as input to interface element generation module 408. Executed interface element generation module 408 may perform operations that generate and route additional interface elements to display unit 106A. In various instances, when rendered for presentation within a corresponding GUI of executed application 104 such as GUI 420, by display unit 106A, the additional interface elements may prompt the user to provide security information or credentials (e.g., a username and password), and in some instances, a selection of one more account related features (e.g., user preferences account and/or one or more services or products to associate with the account).

Additionally, and not illustrated in FIG. 8, the user of user device 101, such as user 430, may provide additional input to input unit 106B. The additional input may identify and characterize the security information or credentials for the requested account to be generated/created, and in some instances, one or more account related features. Moreover, based on the additional input, input unit 106B may generate additional input data identifying and characterizing the security information or credentials, and in some instances, the one or more account related features, for the requested account to be generated/created. Further, input unit 106B may route the additional input data to executed response module 406. Executed response module 406 may generate account feature data, such as account feature data 841 of FIG. 8, identifying and characterizing the security information or credentials, and in some instances, the one or more account related features. In some instances, executed response module 406 may generate an additional message and package one or more portions of the additional input data into portions of the additional message. Additionally, executed response module 406 may transmit the additional message to institution computing system 120.

Figure 9:
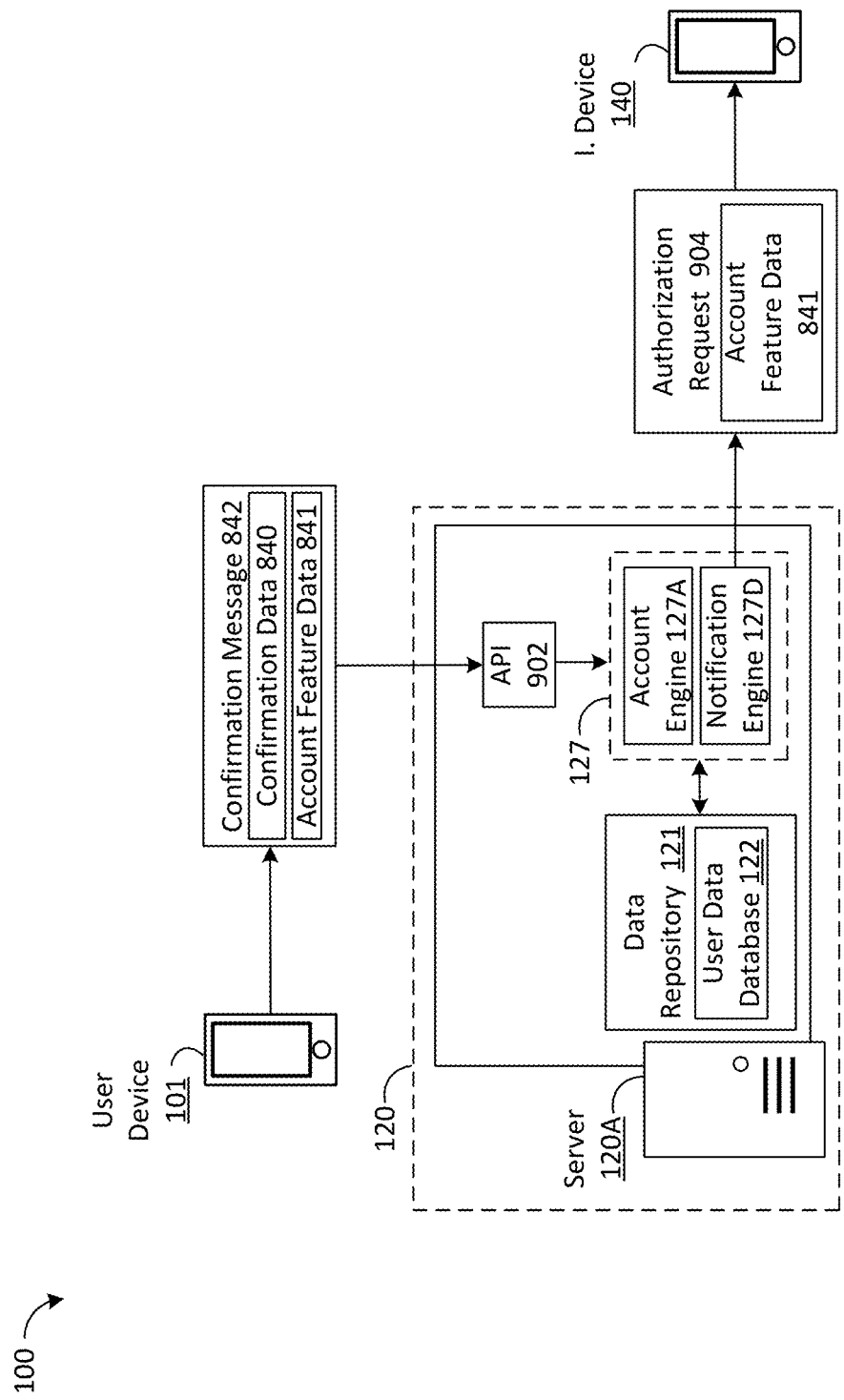

Referring to FIG. 9, a programmatic interface established and maintained by institution computing system 120, such as API 902, may receive confirmation message 842 including portions of confirmation data 840 and account feature data 841. As described herein, institution computing system 120 may receive confirmation message 842 via a channel of communications established programmatically between API 902 and executed response module 406. Additionally, API 902 may route confirmation message 842 to executed account engine 127A. As described herein, executed account engine 127A may perform operations that create an account for the requesting user based on confirmation message 842.

In some examples, executed account engine 127A may generate the account upon receiving an authorization indication from an institution device, such as institution device 140. For example, executed account engine 127A may obtain confirmation message 842 (or additional message) and parse confirmation message 842 (or additional message) to obtain confirmation data 840 and account feature data 841. In some instances, executed account engine 127A may store confirmation data 840 and account feature data 841 within corresponding portions of data repository 121, such as user data database 122. Additionally, executed account engine 127A may provide the account feature data 841, to executed notification engine 127D. Executed notification engine 127D may generate an authorization request 904 and package one or more portions of account feature data 841 into portions of the authorization request 904. Additionally, Further, executed notification engine 127D may transmit authorization request 904 to institution device 140.

Figure 10:
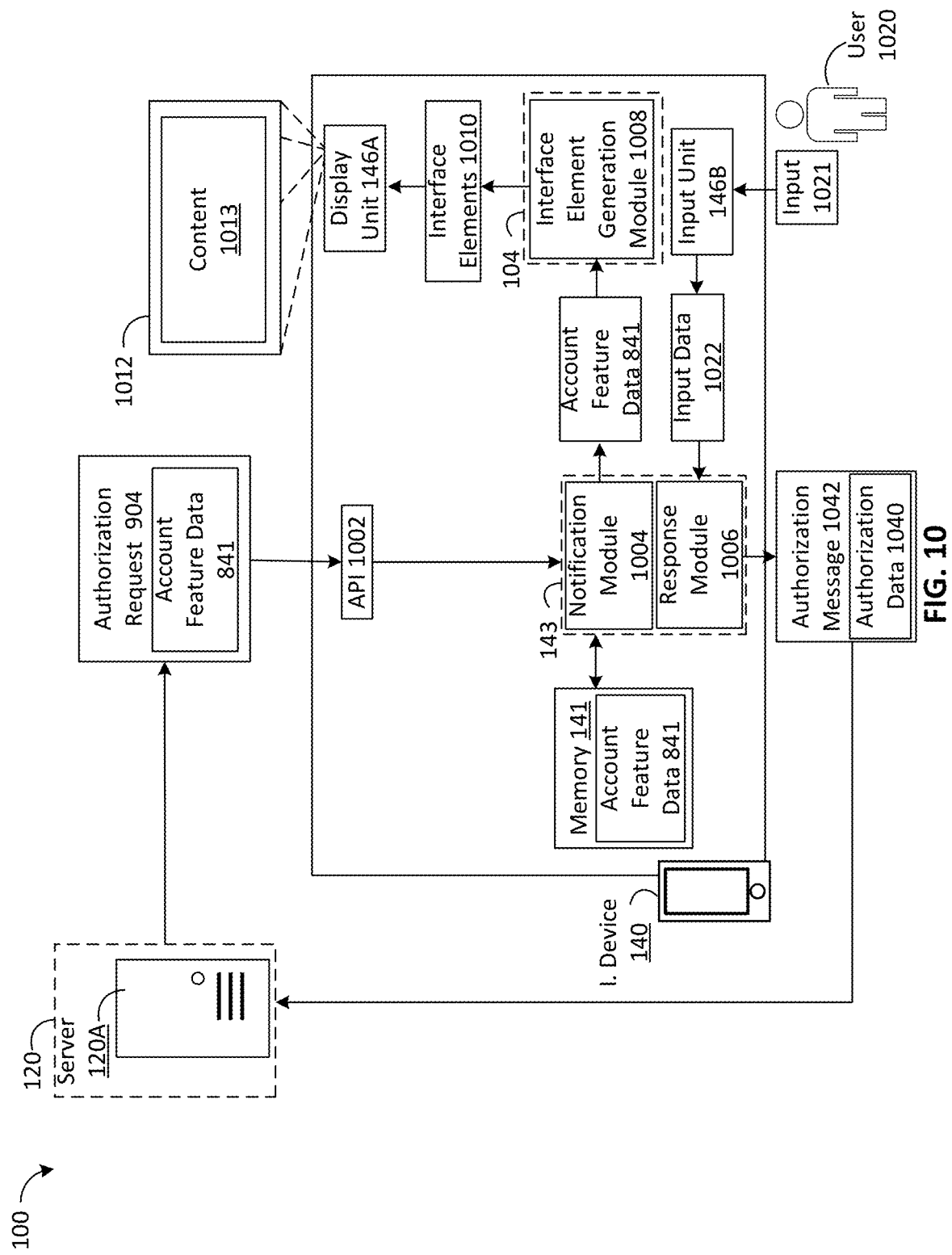

Referring to FIG. 10, a programmatic interface established and maintained by institution device 140, such as API 1002, may receive authorization request 904 including the one or more portions of account feature data 841. As described herein, institution device 140 may receive authorization request 904 via a channel of communications established programmatically between API 1002 and executed notification engine 127D. Additionally, API 1002 may route authorization request 904 to notification module 1004. As described herein, one or more processors of institution device 140, such as processor 145, may execute notification module 1004 to parse authorization request 904 and obtain the one or more portions of account feature data 841 from authorization request 904. In some instances, executed notification module 1004 may store the one or more portions of account feature data 841 into memory 141.

In some examples, executed notification module 1004 may provide the one or more portions of account feature data 841 to interface element generation module 1008. Executed interface element generation module 1008 may perform operations that generate and route interface elements 1010 to display unit 146A based on the one or more portions of account feature data 841. In various instances, when rendered for presentation within a corresponding GUI of executed application 143, such as GUI 1012, by display unit 146A, interface elements 1010 may provide content 1013. In such instances, content 1013 may provide a graphical representation of authorization request 904 to a representative of the institution operating institution device 140, such as user 1020, within a single display screen or window, or across multiple display screens or windows, of the GUI (e.g., in accordance with the one or more elements of layout data, as described herein). As described herein, application 143 may be maintained and supported by institution computing system 120.

As described herein, content 1013 may include data or information included in the one or more portions of input data 832 or in some instances the addition input data. Additionally, the graphical representations of GUI message 704 may include an interactive element/feature, such as a button, that enables the representative of the institution to authorize the creation or generation of an account for the user of user device 101. For instance, a representative of the institution operating institution device 140, such as user 1020, may provide input 1021 to input unit 146B. Input 1020 may indicate whether the representative of the institution authorizes the creation or generation of an account for the user of user device 101. Additionally, input unit 146B may generate input data 1022 based on input 1021 and indicating authorization of the creation or generation of an account for user of user device 101. Moreover, input unit 146B may route input data 1022 to response module 1006. The one or more processors of institution device 140 may execute response module 1006 to generate authorization data 1040 based on input data 1022. Authorization data 1040 may indicate whether the representative of the institution authorizes the creation/generation of an account for the user of user device 101. Executed response module 1006 may generate authorization message 1042 and package within portions of authorization message 1042 one or more portions of authorization data 1040. Further, executed response module 1006 may transmit authorization message 1042 to institution computing system 120. Based on the authorization message 1042, institution computing system 120 may generate/create the requested account for the user of user device 101.

In some instances, executed application 143 may automatically determine whether to verify account feature data 841 included in authorization request 904 and whether to authorize the creation or generation of the account for the user of user device 101. In such instances, the one or more processors of the institution device, such as processor 145, may execute a verification module. The verification module my implement one or more machine learning processes to determine whether to verify the data included in the authorization request and whether to authorize the creation or generation of the account for the requesting user. For instance, the one or more machine learning processes may determine whether account feature data 841 included in authorization request 904 includes enough information for institutional computing system 120, such as executed account engine 127A, to generate corresponding account data. Such determinations may be based on predetermined account requirement data indicating the minimum information that may be needed for account generation/creation (e.g., at least one type of security information or credential, such as a pin number, phone number or user name and password combination). Additionally, the predetermined account requirement data may indicate the required length and complexity of the security information or credential, such as a password or pin number.

Additionally, the verification module may generate authorization message 1042 that includes authorization data 1040 indicating whether the executed verification module verifies the data included in authorization request 904 and authorizes the creation or generation of the account for the user of user device 101. For instance, executed verification module may obtain authorization request 904 and parse authorization request 904 to obtain account feature data 841. Additionally, executed verification module may determine whether account feature data 841 includes enough information (and/or in some instances, the length and complexity of the security information or credential meets the indicated requirements) for institutional computing system 120, such as executed account engine 127A, to utilize to generate corresponding account data for the user of user device 101. In such an instance, executed verification module may generate authorization data 1040 indicating the executed verification module has verified account feature data 841 and authorizes the creation or generation of the account for the user of user device 101. Additionally, executed verification module may generate verification message 1042 and package within portions of verification message 1042, one or more portions of the generated authorization data 1040. Moreover, verification module may transmit authorization message 1042 to institution computing system 120.

Figure 11:
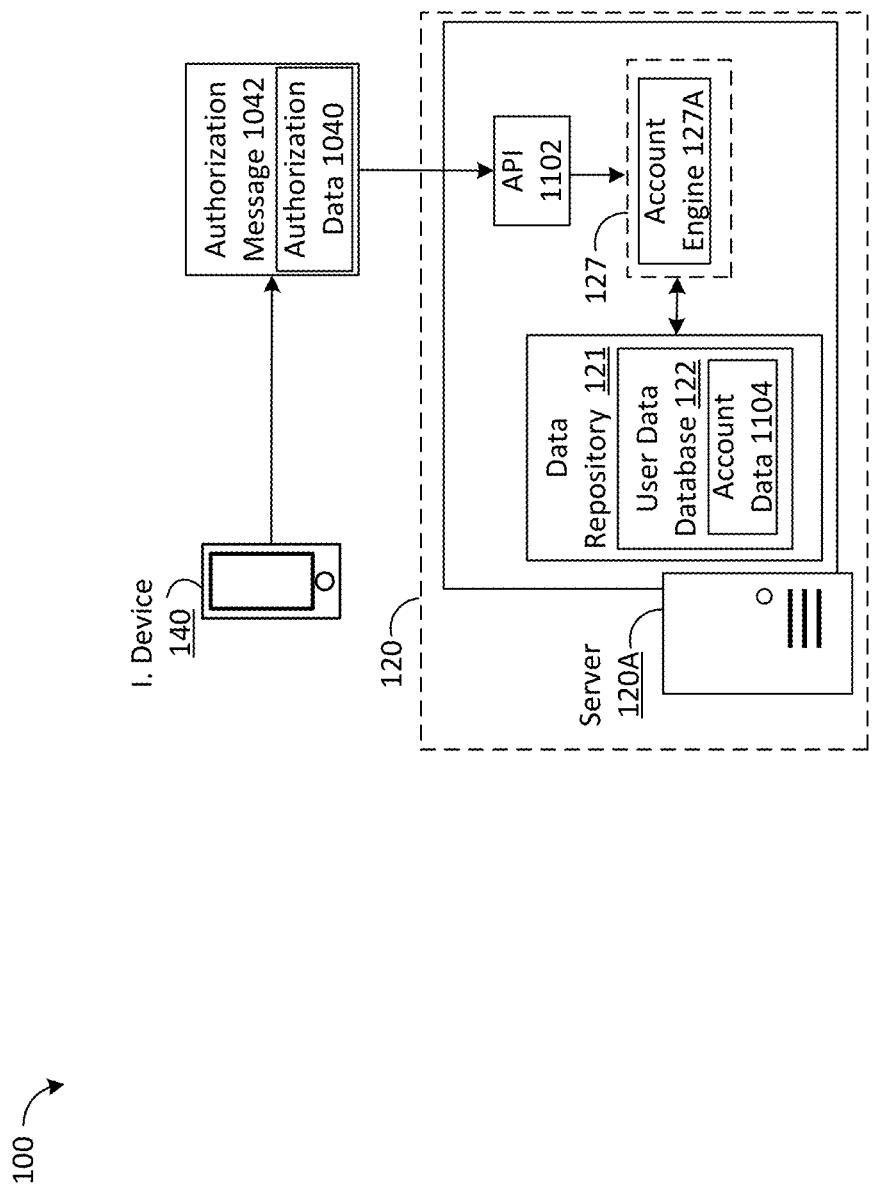

Referring to FIG. 11, a programmatic interface established and maintained by institution computing system 120, such as API 1102, may receive authorization message 1042 including portions of data indicating whether there is authorization to create or generate an account for the user of user device 101, such as authorization data 1040. As described herein, institution computing system 120 may receive authorization message 1042 via a channel of communications established programmatically between API 1102 and executed response module 1006. Additionally, API 1102 may route authorization message 1042 to executed account engine 127A. In some instances, executed account engine 127A may parse authorization message 1042 and obtain authorization data 1040. Additionally, executed account engine 127A may store authorization data 1040 within a corresponding portion of data repository 111, such as authorization data database 1104.

As described herein, executed account engine 127A may perform operations that create an account for the requesting user based on authorization message 1042 and confirmation message 842, or in some instances, the additional message including additional input data. For example, executed account engine 127A may obtain authorization data 1040 and determine whether the representative of the institution has authorized the creation/generation of an account for the user of user device 101. Additionally, in response to determining the representative of the institution has authorized the creation/generation of an account for the user of user device 101, executed account engine 127A may obtain input data 832 or in some instances, the additional input data, from user data database 122. Based on the input data 832 or in some instances, the additional input data, executed account engine 127A may generate account data for the user of user device 101. As described herein, the account data of the user of user device 101 may identify and characterize an account for the user of user device 101. Additionally, the account data of the user of user device 101 may include data identifying and characterizing account information of the requesting user, such as the corresponding security information or credentials (e.g., pin number, phone number, or security election), and in some instances, information of one or more account related features, such as user preferences associated with the account and/or one or more products or instruments issued by the institution, and in some instances the security election.

In various examples, the account data of user device 101 may include information associated with a security election. As described herein, a security election may include (among others) one or more of a user pin number to associate the requested account to, user preferences related to two factor authentication, such as a phone number, an email address, and/or messaging preferences, etc. In such examples, the GUI data or additional GUI data described herein, may further cause a corresponding GUI of executed application 104 to prompt the user to provide a security election. Additionally, the additional input data derived from the input of the user of user device 101, such as input 831 of user 430, may also indicate the security election. Moreover, executed account engine 127A may utilize portions of the additional input data corresponding to the security election when generating the account data of the user of user device 101. The account data may include data identifying and characterizing the security election.

Figure 17:
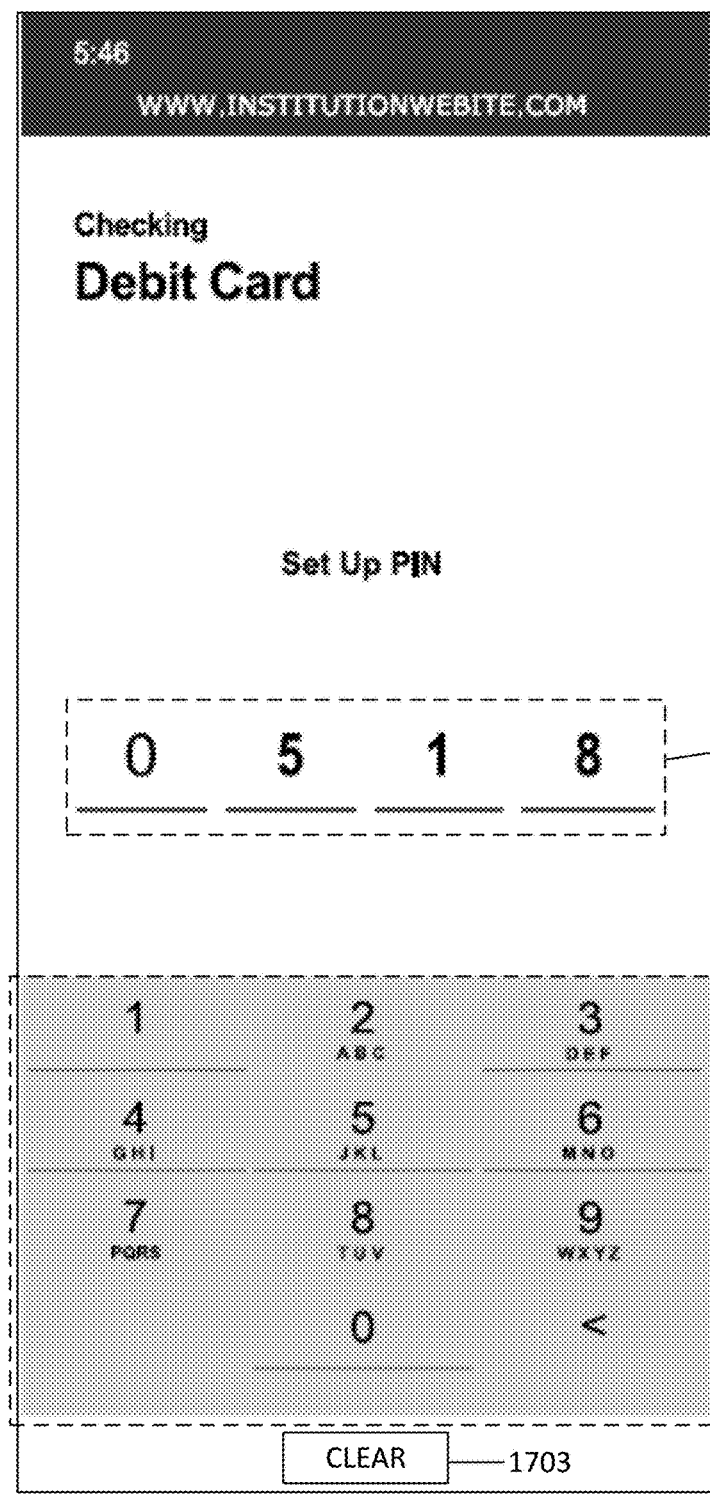
FIG. 17 is another example graphical user interface (GUI), in accordance with some exemplary embodiments.

By way of example, and referring to FIG. 17, the GUI of executed application 104 may include content, such as content 821, that enables the user of user device to input a security election. In some instances, content 821 may request the user to provide a personal identification number (PIN) to associate the requested account to. As illustrated in FIG. 17, content 821 may include interactive interface feature 1701 that enables the user of user device 101 to input the PIN, such as via a digital PIN pad. Additionally, content 821 may include interface feature 1702 that presents the inputted PIN to be associated with the requested account. Moreover, content 821 may include interactive interface feature 1703 to clear the inputted PIN and interactive interface feature 1704 to submit the inputted PIN. As described herein, the submitted and inputted PIN (or any inputted security election, such as a password, a biometric identifier (e.g., thumbprint, facial recognition, or the like), and/or a third-party application temporary authenticator code)) may be input 431. Additionally, input unit 106B may include input 431 corresponding to the inputted PIN (or any inputted security election) into input data 432 and executed response module 406 may include portions of input data 432 corresponding to the inputted PIN (or any inputted security election) into additional user data 440.

In some examples, executed account engine 127A may perform operations that validate user device 101 (or any other user device), based on the security election, via a form of two factor authentication and/or any other protocol. In some instances, executed account engine 127A may validate user device 101 (or any other user device) while institution computing system 120 is performing operations to create or generate an account for the user of user device 101. For instance, the user of user device 101 may trigger a device validation process utilizing executed application 104 (or even via a website displayed on display unit 106A of user device 101). In some instances, the device validation process may be a time sensitive process. Additionally, executed account engine 127A may, during the device validation process, generate and transmit a message including prompt data to user device 101. User device 101 may utilize the prompt data to cause a prompt to be displayed on user device 101 (e.g., display unit 106A). User of user device 101, such as user 430, may provide one or more inputs to input unit 106B. The one or more inputs may correspond to a security election (e.g., pin number, phone number, etc.). Additionally, user device 101 may generate input data corresponding to the one or more inputs and indicating the security election. Moreover, user device 101 may generate a response message and package into the response message one or more portions of the input data, and in some instances, device information (e.g., metadata, device identification (ID), application, and website information). User device 101 may transmit the response message to institution computing system 120, and executed account engine 127A may authenticate user device 101 based on the data/information included in the response message.

In other instances, institution computing system 120 may establish a secure communication channel with user device 101 (or any user device). Additionally, executed application 104 of user device 101 (or software application or platform supported and maintained by institution computing system 120 and executed on any user device) may encrypt one or more communication sessions, such as the message including the one or more inputs corresponding to the security election and the corresponding device information of user device 101. For instance, institution computing system 120 may establish an encrypted line of communication (e.g., Secure Sockets Layer (SSL) protocols). In such an instance, one or more SSL authentication types, such as (without limit): Extended Validation, Organization Validation, and Domain Validation may be implemented using a certificate-based authentication with 256-encryption and 2048-bit Certificate Signing Request encryption. In some instances, institution computing system 120 may include security components capable of implementing two-factor authentication. In various instances, institution computing system 120 may include security components capable of implementing two-factor authentication, Secure Sockets Layer (SSL) protocols for encrypted communication sessions, biometric authentication, token-based authentication, and others.

Additionally, based on and in response to executed account engine 127A validating the user of user device 101 and user device 101, executed account engine 127A may whitelist user device 101 as a recognized device associated with the user. Further, executed account engine 127A may automatically establish two-factor authentication by requesting security related information during one or more steps in the onboarding process, thereby eliminating the need to separately establish two-factor authentication via a process that occurs after the user's account is opened. For example, institution computing system 120 may push another prompt to user device 101. The prompt may request that the user of user device 101 provide, via input unit 106B and through the executed application 104, security identifiers during the onboarding process that may automatically establish two factor authentication.

Figure 12:
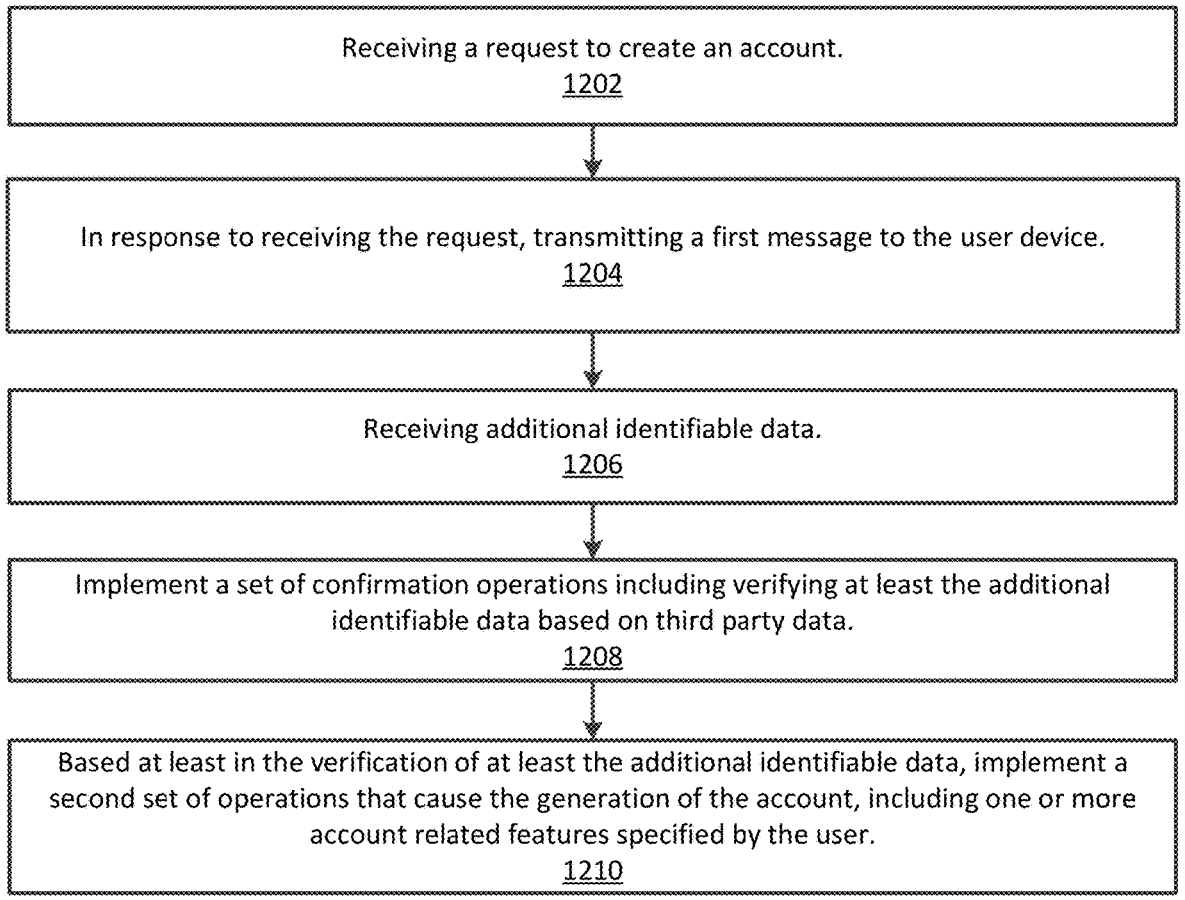
FIG. 12 is a flowchart of an exemplary process 700 for monitoring a digital asset associated with a distributed ledger.

FIG. 12 is a flowchart of an exemplary process 1200 for creating or generating an account of a user of a user device, such as user device 101, in accordance with some exemplary embodiments. For example, one or more computing systems, such as institution computing system 120, may perform one or more of the steps of exemplary process 1200, as described below in reference to FIG. 12. Referring to FIG. 12, institution computing system 120 may perform any of the processes described herein to receive request 202 to create an account (e.g., in step 1202 of FIG. 12). In some examples, the request may be transmitted from a user device, such as user device 101. Additionally, the request may include preliminary or a first set of identifiable data of a user operating the user device. For example, based on additional inputs provided, via input unit 146B, by the user of user device 101, executed application 104 may obtain one or more portions of user data 103. Moreover, executed application 104 may generate request 202 and package within portions of request 202, the one or more portions user data 103. Further, executed application 104 may transmit request 202, along with the one or more portions of user data 103, to server 120A of institution computing system 120. In some instances, based on the one or more inputs of the user, executed application 104 may obtain the one or more portions of user data 103 from memory 102. In other instances, executed application 104 may obtain the one or more portions of user data 103 directly from a GUI of executed application 104 that the user of user device 101 is interacting with.

As described herein, application 104 or the platform, may enable dynamic collaboration via an interactive graphical user interface (GUI) capable of receiving input in real-time, and simultaneously from one or more users. Additionally, institution computing system 120 may, via application 104, provide a prompt, via a GUI of application 104, for one or more tasks or notifications. In some instances, the tasks may be associated with a request for additional identifiable data/information or authenticating information/documents. In such instances, application 104 may enable institution computing system 120 to request and receive the requested identifiable information/data or authenticating documents/information of the one or more users via a corresponding user device, such as user device 101. Examples of identifiable information of each of the one or more users may include (without limit), a corresponding social security number, a corresponding name, corresponding address(es), corresponding credit scores, corresponding transaction history, criminal records, corresponding background information, corresponding biometric data, corresponding phone number(s), corresponding email address(es), corresponding demographic information, corresponding financial information, corresponding work information, and authentication documents (e.g., a driver's license, an identification card, biometric scan, etc.).

In other instances, the notifications may be associated with at least one of one or more alerts and/or notifications indicating, without being limited to, any updates to an onboarding process, account status, checklists, onboarding requirements, security prompts, current and/or predicted user activity, changes in user activity, benchmark goal progress indications, and the like. For example, institution computing system 120 may, via application 104, provide a prompt or notification, via a GUI of application 104, regarding the progress the user of user device 101 makes in completing certain milestones of a particular task institution computing system 120 and/or a representative of the institution operating institution device 140 may have set out (e.g., request for additional identifiable data or information).

Referring back to FIG. 12, in response to receiving request 202, institution computing system 120 may perform any of the processes described herein to transmit a first message or prompt message 304 to user device 101 (e.g., step 1204 of FIG. 12). As described herein, prompt message 304 may include prompt data 306. Prompt data 306 may indicate additional identifiable data or information to be requested from the user of user device 101. In some examples, executed account engine 127A may determine the additional identifiable data or information based on the first set of identifiable data or information included in request 202.

In various examples, user device 101 may utilize prompt data 306 to prompt the user of user device 101 to provide the additional identifiable data or information identified and characterized in prompt data 306. For example, executed notification module 404 may provide prompt data 306, and in some instances, the associated layout data, as an input to executed interface element generation module 408. Executed interface element generation module 408 may perform operations that generate and route interface elements 410, associated with the prompt data 306, and in some instances, the associated layout data, to display unit 106A. In some instances, when rendered for presentation within a corresponding GUI, such as GUI 420, by display unit 106A, interface elements 410 may provide content 421. Content 421 may provide a graphical representation of prompt message 304 to the user of user device 101, such as user 430, within a single display screen or window, or across multiple display screens or windows, of the GUI (e.g., in accordance with the one or more elements of layout data, as described herein). In some examples, content 421 may include a prompt for the user of user device 101 to provide the determined additional identifiable information. Any provided additional identifiable information or data may be included in additional user data 440 by executed response module 406. In some instances, the determined additional identifiable information/data may be an identification document and/or card associated with the user of user device 101. In such instances, the user of user device 101 may utilize a camera to capture an image or picture of the identification document and/or card associated with the user of user device 101. Additionally, executed application 104 may apply optical character recognition techniques on the image of the identification document and/or card to obtain additional identifiable data associated with the user of user device 101. Executed application 104, such as executed response module 406, may generate additional user data 440 to include the image of the identification document and/or card along with the additional identifiable data obtained from the image. In either instance, executed application 104, such as executed response module 406, may transmit the additional user data 440 to institution computing system 120.

Referring back to FIG. 12, institution computing system 120 may perform any of the processes described herein to receive additional user data 440 from user device 101 (e.g., step 1206 of FIG. 12). Additionally, based on the additional identifiable data, institution computing system 120 may perform any of the processes described herein to implement a set of confirmation operations including verifying at least the additional user data 440 based, at least in part, on third-party data (e.g., step 1208 of FIG. 12), such as verification data 608 or one or more portions of user data 604 stored in a third-party computing system (e.g., third-party computing system 110).

In some examples, executed verification engine 127B may itself verify the identifiable information or data of the user, such as the additional user data 440 of the user of user device 101, utilizing the one or more portions of user data 604. In other examples, executed verification engine 127B may request one or more other computing systems, such as third-party computing system 110, to verify the identifiable information or data of the user, such as the additional user data 440 of the user of user device 101. In such examples, the other computing system(s) may transmit to institution computing system 120, verification data 608 indicating whether the identifiable information or data of the user is verified as being correct or accurate. Additionally, the set of confirmation operations may include confirming, with the user of user device 101, whether the verified identifiable information or data of the user of user device 101 is correct or accurate.

Further, based at least on the verification of at least additional user data 440, institution computing system 120 may perform any of the processes described herein to implement a second set of operations that cause the generation of the account, including one or more account related features specified by the user (e.g., step 1210 of FIG. 12). In some examples, in response to and/or based on the verification of identifiable information or data of the user of user device 101, such as additional user data 440, institution computing system 120, such as executed account engine 127A, may further request or obtain from the user of user device 101, security information or credentials, one or more account related features, and in some instances, a security election. The user of user device 101 may utilize the GUI of executed application 104 to provide information or data characterizing the requested security information or credentials, the one or more account related features, and in some instances, the security election.

Additionally, institution computing system 120, such as executed account engine 127A, may generate the account data for the user of user device 101. As described herein, the account data of the user of user device 101 may identify and characterize the requested account for the user of user device

101. Additionally, the account data of the user of user device 101 may include data identifying and characterizing account information of the requesting user, such as the corresponding security information or credentials (e.g., pin number, phone number, or security election), and in some instances, information of one or more account related features, such as user preferences associated with the account and/or one or more products or instruments issued by the institution, and in some instances, the security election. In other examples, executed account engine 127A may generate the account upon receiving an authorization indication from an institution device, such as institution device 140, as described herein.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including application 104, verification engine 112A, account engine 127A, verification engine 127B, prediction engine 127C, notification engine 127D, application 143, application programming interface (API) 302, API 402, notification module 404, response module 406, interface element generation module 408, API 502, API 602, API 702, API 802, API 902, API 1002, notification module 1004, response module 1006, interface element generation module 1008, and API 1102, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

The invention claimed is:

1. A computing system comprising:
one or more processors and a memory that includes instructions, that when executed by the one or more processors, causes the one or more processors to:
receive, from a user device, a request to create an account, the request including preliminary identifiable data of a user operating the user device;
in response to receiving the request, transmit a first message to the user device, the first message causing the user device to generate, on a graphical user interface (GUI) displayed on the user device, a prompt requesting additional identifiable data associated with the user operating the user device;
receive additional identifiable data received from the user device;
implement a set of confirmation operations that includes:
verifying at least the additional identifiable data based on third-party institution data, said verifying including:
sending a verification request to a third-party institution system,
the third-party institution system parsing the verification request to obtain information corresponding to the additional identifiable data,
obtaining, from a third-party institution database of the third-party institution system, the third-party institution data based on the information parsed from the verification request, and
verifying, by the third-party institution system, the additional identifiable data using the third-party institution data; and
based at least on the verification of at least the additional identifiable data, implement a second set of operations that cause the one or more processors to generate the account including one or more account related features specified by the user.

2. The computing system of claim 1, wherein the one or more processors execute the instructions further to:
receive an input from a second device, wherein the set of confirmation operations is based in part on the input from the second device.

3. The computing system of claim 1, wherein the one or more processors execute the instructions further to:
receive an electronic signature received from the user device, wherein the verifying at least the additional identifiable data is further based on the electronic signature.

4. The computing system of claim 1, wherein the set of confirmation operations further includes:
verifying the preliminary identifiable data based on the third-party institution data.

5. The computing system of claim 1, wherein the second set of operations includes:
presenting on the GUI of the user device the preliminary identifiable data and the additional identifiable data; and
receiving, from the user device, an indication relating to an accuracy of the preliminary identifiable data and the additional identifiable data as displayed on the GUI.

6. The computing system of claim 5, wherein presenting the preliminary identifiable data and the additional identifiable data, includes auto-populating one or more fields displayed on the GUI with the preliminary identifiable data and the additional identifiable data.

7. The computing system of claim 5, wherein the second set of operations includes:
in response to receiving an indication confirming accuracy of the preliminary identifiable data and the additional identifiable data, requesting one or more user inputs including at least a selection of one or more account related features.

8. The computing system of claim 7, wherein the one or more user inputs the one or more processors requests, includes, user-created credentials, and a security election from the user device.

9. The computing system of claim 7, wherein the one or more processors execute the instructions further to:
receive an authorization indication from a second device; and
generate the account including the one or more account related features in response to receiving the authorization indication from the second device.

10. The computing system of claim 1, wherein the one or more processors execute the instructions further to:
establish a communications connection between the user device and a second device in response to receiving the request.

11. A computer-implemented method comprising:
receiving, by a processor of a server and from a user device, a request to create an account, the request including preliminary identifiable data of a user operating the user device;
in response to receiving the request, transmitting, by the processor, a first message to the user device, the first message causing the user device to launch a graphical user interface (GUI) a prompt requesting additional identifiable data associated with the user operating the user device;
receiving, by the processor, additional identifiable data received from the user device;
implementing a set of confirmation operations that includes:
verifying at least the additional identifiable data based on third-party institution data, said verifying including:
sending a verification request to a third-party institution system,
the third-party institution system parsing the verification request to obtain information corresponding to the additional identifiable data,
obtaining, from a third-party institution database of the third-party institution system, the third-party institution data based on the information parsed from the verification request, and
verifying, by the third-party institution system, the additional identifiable data using the third-party institution data; and
based at least on the verification of at least the additional identifiable data, implementing, by the processor, a second set of operations that generate the account including one or more account related features specified by the user.

12. The computer-implemented method of claim 11, further comprising:
receiving an input from a second device, wherein the set of confirmation operations is based in part on the input from the second device.

13. The computer-implemented method of claim 11, further comprising:
receiving an electronic signature received from the user device, wherein the verifying at least the additional identifiable data is further based on the electronic signature.

14. The computer-implemented method of claim 11, wherein the set of confirmation operations further includes:
verifying the preliminary identifiable data based on the third-party institution data.

15. The computer-implemented method of claim 11, wherein the second set of operations includes:
presenting on the GUI of the user device the preliminary identifiable data and the additional identifiable data; and
receiving, from the user device, an indication relating to an accuracy of the preliminary identifiable data and the additional identifiable data as displayed on the GUI.

16. The computer-implemented method of claim 15, wherein presenting the preliminary identifiable data and the additional identifiable data, includes auto-populating a fields displayed on the GUI with the preliminary identifiable data and the additional identifiable data.

17. The computer-implemented method of claim 15, wherein the second set of operations includes:
in response to receiving an indication confirming accuracy of the preliminary identifiable data and the additional identifiable data, requesting one or more user inputs including at least a selection of one or more account related features.

18. The computer-implemented method of claim 17, wherein the one or more user inputs the one or more processors requests, includes, user-created credentials, and a security election from the user device.

19. The computer-implemented method of claim 17, further comprising:
receive an authorization indication from a second device; and generate the account including the one or more account related features in response to receiving the authorization indication from the second device.

20. A non-transitory, machine-readable storage medium storing instructions that, when executed by at least one processor of a server, causes the at least one processor to perform operations that include:

receiving, from a user device, a request to create an account, the request including preliminary identifiable data of a user operating the user device;

in response to receiving the request, transmitting a first message to the user device, the first message causing the user device to launch a graphical user interface (GUI) displayed on the user device, a prompt requesting additional identifiable data associated with the user operating the user device;

receiving additional identifiable data received from the user device;

implement a set of confirmation operations that includes:

verifying at least the additional identifiable data based on third-party institution data, said verifying including:

sending a verification request to a third-party institution system, the third-party institution system parsing the verification request to obtain information corresponding to the additional identifiable data, obtaining, from a third-party institution database of the third-party institution system, the third-party institution data based on the information parsed from the verification request, and verifying, by the third-party institution system, the additional identifiable data using the third-party institution data; and based at least on the verification of at least the additional identifiable data, implementing a second set of operations that generate the account including one or more account related features specified by the user.

* * * * *